(12) United States Patent
Nitsch et al.

(10) Patent No.: US 10,896,593 B1
(45) Date of Patent: Jan. 19, 2021

(54) SYSTEM AND METHOD FOR BROKERING MISSION CRITICAL COMMUNICATION BETWEEN PARTIES HAVING NON-UNIFORM COMMUNICATION RESOURCES

(71) Applicant: FREQUENTIS AG, Vienna (AT)

(72) Inventors: Robert Nitsch, Vienna (AT); Charlotte Roesener, Murstetten (AT); Wolfgang Kampichler, Neunkirchen (AT)

(73) Assignee: Frequentis AG, Vienna (AT)

( * ) Notice: Subject to any disclaimer, the term of this patent is extended or adjusted under 35 U.S.C. 154(b) by 0 days.

(21) Appl. No.: 16/435,761

(22) Filed: Jun. 10, 2019

Related U.S. Application Data

(60) Provisional application No. 62/682,835, filed on Jun. 10, 2018.

(51) Int. Cl.
| | |
|---|---|
| *G08B 25/00* | (2006.01) |
| *H04L 12/761* | (2013.01) |
| *G08B 25/01* | (2006.01) |
| *H04L 12/28* | (2006.01) |
| *H04L 12/18* | (2006.01) |

(52) U.S. Cl.
CPC ......... *G08B 25/004* (2013.01); *G08B 25/014* (2013.01); *H04L 12/185* (2013.01); *H04L 12/2894* (2013.01); *H04L 45/16* (2013.01)

(58) Field of Classification Search
CPC ...... H04M 11/04; G06F 16/972; G06Q 50/01; H04N 21/482; H04N 21/2187; H04W 4/14; H04W 4/029; H04W 4/90; H04L 45/00; H04L 45/34; G08B 25/04; G08B 25/045; G08B 25/00; G08B 25/002; G08B 25/006
See application file for complete search history.

(56) References Cited

U.S. PATENT DOCUMENTS

| | | | |
|---|---|---|---|
| 6,438,217 B1 * | 8/2002 | Huna | H04M 1/64 379/88.14 |
| 7,103,906 B1 * | 9/2006 | Katz | H04N 7/17318 725/87 |
| 7,574,486 B1 * | 8/2009 | Cheng | H04L 29/08072 709/219 |

(Continued)

*Primary Examiner* — Hoi C Lau
(74) *Attorney, Agent, or Firm* — Rosenberg, Klein & Lee

(57) ABSTRACT

A system and method are provided for brokering mission critical communication between a sender and a receiver, where the sender provides a message in a first communication medium and the receiver requires or prefers a second communication medium. An interpretation portion reduces the message to essential knowledge data and generates a content descriptive representation, and a routing portion determines a communication media compatibility of the receiver and selectively sets the second communication medium for the message. A mediation portion then adaptively generates a transformed message in the second communication medium so that it is ascertainable to the receiver, and actuates delivery to the receiver. The interpretation portion is trained to identify image objects in an image which are then represented in the content descriptive representation, thereby enabling the mediation portion to generate text or audio content in the transformed message indicating mission critical features within the image content.

23 Claims, 14 Drawing Sheets

(56) References Cited

U.S. PATENT DOCUMENTS

| | | | | |
|---|---|---|---|---|
| 8,295,801 B2* | 10/2012 | Ray | G10L 13/043 | 455/404.1 |
| 8,320,871 B2* | 11/2012 | Ray | G10L 13/043 | 455/404.1 |
| 8,364,113 B2* | 1/2013 | Ray | G10L 13/043 | 455/404.1 |
| 8,606,218 B2* | 12/2013 | Ray | G10L 13/043 | 455/404.1 |
| 8,630,609 B2* | 1/2014 | Ray | G10L 13/043 | 455/404.1 |
| 8,698,640 B1* | 4/2014 | Gropper | G08B 21/10 | 340/601 |
| 8,712,366 B2* | 4/2014 | Greene | G10L 13/043 | 455/404.1 |
| 8,718,595 B2* | 5/2014 | Ray | G10L 13/043 | 455/404.1 |
| 8,731,516 B2* | 5/2014 | Goodson | H04W 4/90 | 455/404.2 |
| 8,781,439 B2* | 7/2014 | Ray | G10L 13/043 | 455/404.2 |
| 8,805,319 B2* | 8/2014 | Daly | H04L 51/00 | 455/404.1 |
| 9,025,734 B2* | 5/2015 | Ray | G10L 13/043 | 379/45 |
| 9,148,773 B2* | 9/2015 | Daly | H04L 51/00 | |
| 10,390,203 B2* | 8/2019 | Romano | H04M 11/045 | |
| 10,542,146 B2* | 1/2020 | Ferguson | H04Q 3/64 | |
| 10,623,937 B2* | 4/2020 | Patton | G10L 15/22 | |
| 2006/0095410 A1* | 5/2006 | Ostrover | H04N 21/482 | |
| 2008/0096605 A1* | 4/2008 | Gissin | H04L 67/04 | 455/556.2 |
| 2009/0013264 A1* | 1/2009 | Basawapatna | G06F 3/005 | 715/753 |
| 2009/0088191 A1* | 4/2009 | Norton | H04L 65/605 | 455/466 |
| 2010/0002846 A1* | 1/2010 | Ray | H04W 4/90 | 379/37 |
| 2010/0003947 A1* | 1/2010 | Ray | G10L 13/043 | 455/404.1 |
| 2010/0003949 A1* | 1/2010 | Ray | G10L 13/043 | 455/404.1 |
| 2010/0003953 A1* | 1/2010 | Ray | H04W 52/0261 | 455/404.1 |
| 2010/0003954 A1* | 1/2010 | Greene | H04W 4/90 | 455/404.1 |
| 2010/0003955 A1* | 1/2010 | Ray | G10L 13/00 | 455/404.1 |
| 2010/0003961 A1* | 1/2010 | Ray | H04W 4/90 | 455/404.2 |
| 2011/0066431 A1* | 3/2011 | Ju | G06Q 50/01 | 704/235 |
| 2012/0149404 A1* | 6/2012 | Beattie, Jr. | H04M 1/27453 | 455/466 |
| 2012/0214437 A1* | 8/2012 | Ray | H04W 52/0296 | 455/404.2 |
| 2013/0102269 A1* | 4/2013 | Ray | H04M 3/5116 | 455/404.1 |
| 2013/0171958 A1* | 7/2013 | Goodson | H04W 4/14 | 455/404.2 |
| 2013/0185368 A1* | 7/2013 | Nordstrom | H04W 4/023 | 709/206 |
| 2014/0025695 A1* | 1/2014 | Bickle | G06F 16/972 | 707/756 |
| 2014/0099909 A1* | 4/2014 | Daly | H04W 4/14 | 455/404.1 |
| 2014/0329488 A1* | 11/2014 | Daly | H04L 65/00 | 455/404.1 |
| 2016/0191714 A1* | 6/2016 | Johan | H04M 11/04 | 370/354 |
| 2018/0077283 A1* | 3/2018 | Ferguson | H04M 3/5116 | |
| 2018/0184141 A1* | 6/2018 | Panje | H04N 21/2187 | |
| 2019/0020992 A1* | 1/2019 | Romano | H04M 11/045 | |
| 2019/0289263 A1* | 9/2019 | Amini | H04L 41/0813 | |
| 2019/0335308 A1* | 10/2019 | Patton | G10L 15/26 | |

* cited by examiner

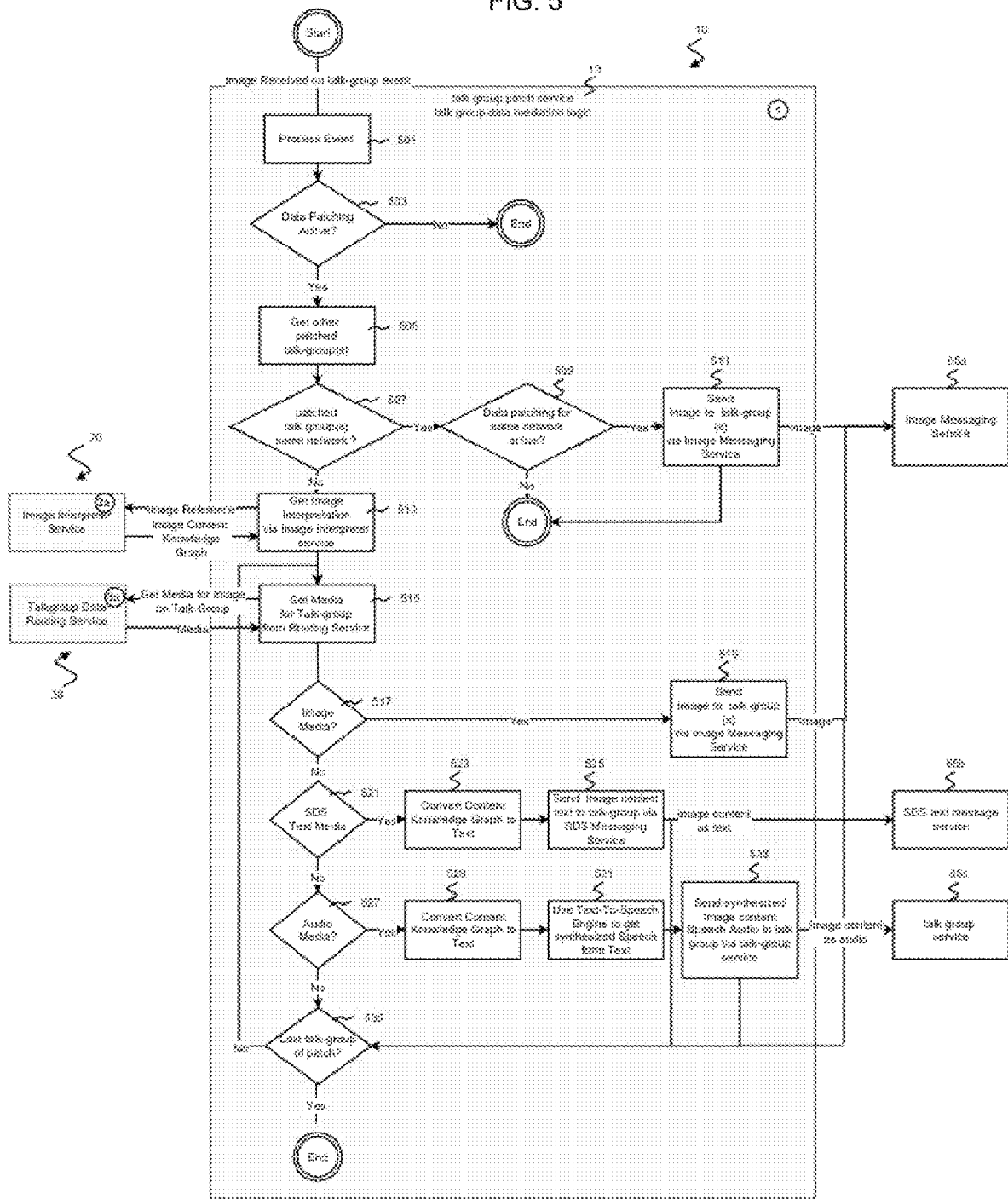

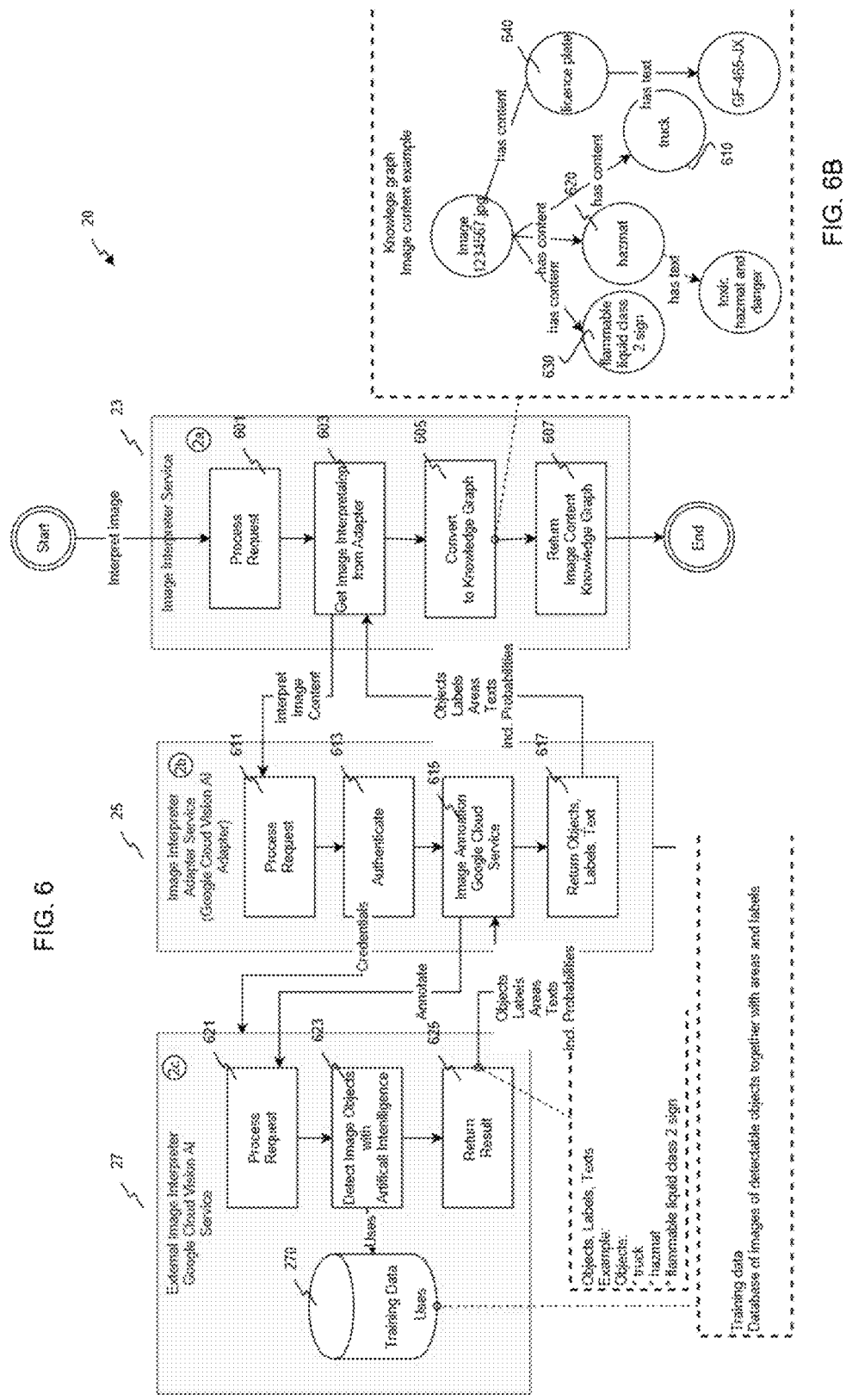

SYSTEM AND METHOD FOR BROKERING MISSION CRITICAL COMMUNICATION BETWEEN PARTIES HAVING NON-UNIFORM COMMUNICATION RESOURCES

RELATED PATENTS AND APPLICATIONS

This application is based on U.S. Provisional Patent Application No. 62/682,935, filed on Jun. 10, 2018, which is incorporated herein by reference.

BACKGROUND OF THE INVENTION

The subject system and method are generally directed to the effective and efficient communication between various parties served by non-uniform communications equipment that may operate over different communication technologies and support different communication media (or combinations of communication media). The subject system and method find application in various mission critical contexts—that is, in numerous contexts where the communication is meant to advance a certain shared objective or undertaking, be it to preserve safety and health, accomplish a common goal, or the like. The subject system and method, moreover, find particularly useful application with the current state of technology, in various forms of telecommunications that occur between various parties.

More specifically, the subject system and method provide for the brokering of mission critical communication between parties that have non-uniform resources for such communication. The system and method enable at least the essential knowledge contained in a message (with respect to a shared mission) to be delivered to a receiver in a form that is ascertainable to that particular receiver. This enables the effective delivery—even without human intervention—of a message's mission-critical content between a sender and receiver who may not otherwise possess sufficiently compatible communication devices or other equipment to so communicate.

In mission-critical contexts, such as public safety response dispatching, seconds count in reacting to crisis situations. Therefore, any information relevant to the mission that may assist, in combination with the appropriate resources and enhanced knowledge, in determining the appropriate timely response to a complex situation is indispensable, supporting both the dispatchers and the dispatched.

Traditionally, citizens, persons in need, and officers in the field contact a control room through various telecommunication means. They do so, for instance, by dialing an emergency number, which typically results in a voice call (using natural language) where call-takers/dispatchers are guided through the process of collecting information from the caller. This information is sometimes collected by using assisting software and protocols. However, in this technologically advanced age of the Internet of Things (IoT), of emergency "apps," of far reaching online social media, and the like, distress information may originate from a wide variety of sources, and the roles of Public Service Answering/Access Point (PSAP) Control Rooms have needed to change accordingly. The problem for the dispatcher in such contexts, therefore, is frequently not a lack of information, but an information overload that confuses and distracts the dispatcher rather than assisting them.

Additionally, an emergency "call" need not even come from a human being, but might be provided by an automated device or system enabled to raise attention to a critical situation. This and other received communications, however, may be overwhelming, or received in a format that is not conducive to message processing or message forwarding to a party in the field to be dispatched.

In many telecommunication systems heretofore known, due to expected limits on the part of dispatched parties, data supported by their communication equipment is often limited to text information. Text data typically does not require high data rate transmission and may be rendered on relatively simple displays. Data in other formats, especially images and video, typically require the intervention of a human dispatcher/operator, who must manually generate a descriptive message in text form before forwarding it to the dispatched party. This costs precious time and consumes limited human resources.

There is therefore a need for an automated system which provides for the efficient yet effective mediation needed to patch together various senders and receivers of mission critical message, notwithstanding the disparate nature of their communications equipment and non-uniformity of the communication media and transmission technologies supported or employed thereby.

SUMMARY OF THE INVENTION

It is an object of the disclosed system and method to broker messages in a variety of content formats and types (e.g. audio, video, text, images, etc.) to thereby enhance communication between parties.

It is another object of the disclosed system and method to support newer generations of dispatching systems and communication technologies with new methods for information handling, placing the right information is in the right place at the right time.

It is still another object of the disclosed system and method to detect critical situations described in a diversity of sources, such as video feeds, rather than waiting to receive the first literal call.

These and other objects may be attained in a system and method for a control room message broker for mission critical communication. In accordance with certain embodiments of the present invention, a system is provided for brokering mission critical communication, transmitted by a sender, for adaptive delivery to a receiver in ascertainable form. The system includes a mediation portion executing on a processor to receive a message from the sender in a first communication medium, and to adaptively generate a transformed message in a second communication medium ascertainable to the receiver. The mediation portion actuates delivery of the transformed message to the receiver. The system also includes an interpretation portion executing on a processor, responsive to said mediation portion, to reduce the message received from the sender to essential knowledge data in accordance with predetermined mission critical criteria. The interpretation portion generates a content descriptive representation of the essential knowledge data. The system also includes a routing portion executing on a processor, responsive to said mediation portion, to determine a communication media compatibility of the receiver. The routing portion selectively sets the second communication medium for the transformed message based thereon.

In accordance with other embodiments of the present invention, a system is provided for brokering mission critical communication transmitted between a sender and a receiver having disparate communication media compatibilities. The system includes a mediation portion executing on a processor to receive a message from the sender in a first communication medium, and to adaptively generate a transformed message in a second communication medium ascertainable to the receiver. The mediation portion actuates delivery of the transformed message to the receiver. The system also includes an interpretation portion executing on a processor, responsive to said mediation portion, to reduce the message received from the sender to essential knowledge data in accordance with predetermined mission critical criteria. The interpretation portion generates a knowledge graph of the essential knowledge data. The system also includes a routing portion executing on a processor, responsive to said mediation portion, to determine the communication media compatibilities of the sender and receiver. The routing portion selectively sets the second communication medium for the transformed message based thereon.

In accordance with other embodiments of the present invention, a method is provided for brokering of mission critical communication, transmitted by a sender, for adaptive delivery to a receiver in a form compatible therewith. The method includes executing mediation processing to receive a message from the sender in a first communication medium and to adaptively generate a transformed message in a second communication medium ascertainable to the receiver. The mediation processing controls delivery of the transformed message to the receiver. The method also includes executing interpretation processing, responsive to said mediation processing, to reduce the message received from the sender to essential knowledge data in accordance with predetermined mission critical criteria. The interpretation processing generates a content descriptive representation of the essential knowledge data. The method also includes executing routing processing responsive to said mediation processing to determine a communication media compatibility of the receiver. The routing processing selectively sets the second communication medium for the transformed message based thereon.

Additional aspects, details, and advantages of the disclosed system and method will be set forth, in part, in the description and figures which follow.

BRIEF DESCRIPTION OF THE DRAWINGS

FIG. 5 is a flow diagram illustrating a flow of processes for image transformation and transmittal in a mediation portion, in accordance with an exemplary embodiment of the present invention;

FIG. 6 is a flow diagram illustrating a flow of processes for image interpretation in an interpretation portion, in accordance with an exemplary embodiment of the present invention;

FIG. 6B is a depiction of a knowledge graph generated from the image in FIG. 6A, in accordance with an exemplary embodiment of the present invention;

DETAILED DESCRIPTION OF THE PREFERRED EMBODIMENTS

Figure 1A:
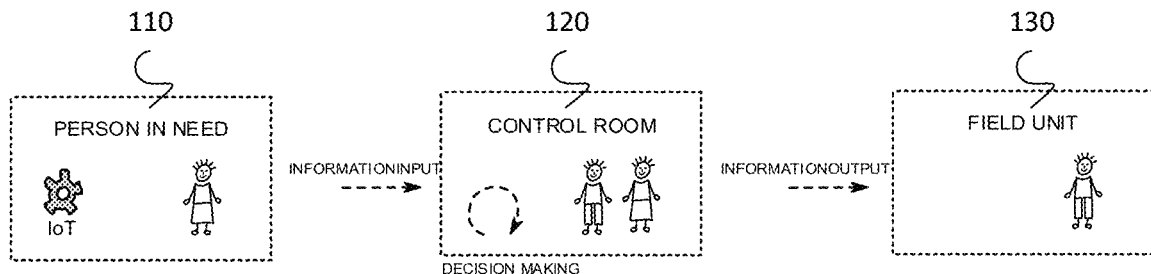
FIGS. 1A-1C are diagrams illustrating interactions of parties in traditional dispatching systems.

Reference will now be made in detail to exemplary embodiments, which are illustrated in the accompanying drawings, wherein like reference numerals refer to the like elements throughout. The embodiments are described below in order to explain the disclosed system and method with reference to the figures illustratively shown in the drawings for certain exemplary embodiments for sample applications.

Recent developments in commercial technologies like the Long-Term Evolution (LTE) standard, 5G standard, and Emergency Services IP Network (ESINet) provide for high data rates, and promise to support service quality and preemption mechanisms to be utilized for mission critical services. With the increasing capabilities of consumer electronics now available on the commercial market, users worldwide have become accustomed to applications that share rich data (audio, video, text, images, etc.), and therefore expect rich data to be receivable in all contexts and by all parties. Ideally, this would extend to communications from the public to an emergency control room (or PSAP) and from there to first responders.

There are presently numerous communication protocols in common usage on a wide variety of devices. In an optimal situation, to communicate with a device which is limited to a particular protocol, one would use another device which can transmit using the same protocol. However, there may not be an opportunity to locate such a device, especially for emergency communications or other circumstances where timing is critical. Therefore, a networking platform capable of processing a vast number of protocols, and of converting a communication from one protocol to another, is desired. The ideal such platform would be able to take a communication from any first device with any protocol, intended for any second device with any other protocol, and convert the communication into a form which will be comprehensible through the second device.

In some cases, such conversion can be accomplished with various adapter modules, implemented as either hardware or as software executing on a processor, which are known in the art. However, some protocols have differing compatibilities in transmitting media content, such as images, audio, and text. In some cases, a protocol is limited to only one content type, such as text (a pager or text messaging system) or audio (a "dumb phone" or radio). While converting content between protocols without changing the content type is trivial in most circumstances, problems arise when a receiving device has a protocol without the capability to process that content type. In such cases it is necessary to transform the content from one content type, which is obviously ascertainable to the source transmitting device but not to the receiving device, to another content type which the receiving device is able to recognize and process.

Briefly, a system and method realized in accordance with certain aspects of the present invention provide for the brokering of mission critical communication between parties that are variously equipped for such communication. In view of the shared mission of a sender and receiver, the system and method determines the communication compatibility of the receiver and enable at least the essential knowledge contained in a message to be delivered to the receiver in a form that is ascertainable to that particular receiver. This enables the automated, effective delivery of a message's mission critical content between the sender and receiver, though they may not otherwise be equipped with sufficiently compatible communication resources to so communicate.

The system and method provide more specifically provide for the interpretation of messages from a sender and their suitable transformation in form and/or content to a transformed message compatible with the receiver's communication resources. This "message broker" is used for the validation, transformation, and routing of messages between parties equipped to support different communication media (audio, video, text, images, etc.) and transmission network technologies. In public safety response/dispatch applications, for instance, the system and method serve to automatically mediate between various telecommunications measures used by the public and first responders, and thereby break down communication barriers between them.

The system and method do so in light of certain predetermined mission critical criteria, against which the pertinence of certain informational content of a message may be determined. In public safety response/dispatch applications, for example, such predetermined mission critical criteria may descriptively delineate notable features to detect in an incoming image such as hazard signs, occurrence of fire or other indications of emergencies or crises, road signs, nearby landmarks, and the like.

In telecommunications applications, the system and method preferably support the mediation processing of message content of all types (speech and other audio, video, text, images, etc.) by which mission critical information may be communicated between parties. In particular, to resolve the problem of compatibility between, for instance, communications equipment which support messages containing images and equipment limited to messages containing either text or audio, an image interpreter is trained to detect image objects which are considered pertinent to the particular shared mission. The detected objects (e.g. signs) and the essential mission critical knowledge they indicate or present (e.g. text on the signs) are extracted and organized into a content descriptive representation. In the exemplary embodiment illustrated herein, the extracted essential knowledge is preferably organized into a suitable semantic representation, such as a knowledge graph. This is then convertible to text or audio according to the communication media compatibility of the receiving device.

As noted, one illustrative example with particular applicability arises in the context of emergency communication to an emergency operator/dispatcher, and therethrough to a first responder. In such an example, images might be captured of emergency conditions such as an unsafe driver or a fire. The image interpreter is therefore trained to identify relevant objects depicted in the images such as hazards, relevant signs, license plates, and other information identifying persons or locations. These objects, and information contained therewithin (e.g. for a license plate, a plate number and a state identification), are organized into the knowledge graph, which is then convertible to text or audio.

This concept does not stop at enhancing communication messages originated by human sources. In this Age of Internet of Things (IoT), an emergency call may not necessarily come from a human being, but can be from any device configured and enabled to raise attention to a critical situation. In further scenarios, the subject system and method also accommodates detection of mission critical situations and origination of corresponding messages directly from diverse sources (e.g. social media).

This illustrative example is based on the expectations that offices of public organizations, like ambulances, police, fire brigades, and other security professionals have high interest in gathering essential additional information about an emergency case, receiving important details of an incident even before arriving at the scene. In this context, it is important to determine what information is essential to the given mission, whether this information can be transmitted in real time given the available data rates, and whether the devices on the receiving end have the capacity to suitably render this information.

For convenience and brevity, this example application is described in detail herein, as the system and method provide particular advantages in the context of roadside and other emergencies. However, those of skill in the art will readily recognize other applications of the system and method described herein, both in public safety response/dispatch contexts and otherwise.

In one illustrative embodiment of the present invention, the subject system and method are embodied, for example, in a control room message broker (CRMB). In the particular context of an emergency dispatching platform, a primary purpose of the CRMB is to take incoming messages of various form from various sending sources (e.g. public, first responder, IoT, etc.) and process them for mission critical purposes, including patching messages received through different communication media (audio, video, text, images, etc.) and transmission technologies (e.g. land mobile radio with telephony, social media, Apps, etc.). For instance, in certain embodiments, the CRMB performs a context sensitive data analysis with the objective of identifying the proper data bearer and, if necessary, render data to comply both with the available communication services and with the capabilities of a first responder's mobile device to display data. Further, the CRMB routes messages to one or more destinations (e.g. a first responder), utilizing any available data link or bearer.

In accordance with certain aspects of the present invention, in this context at least three parties are preferably involved: a sending party (e.g. a person in need, IoT device, etc.) who/which provides an alert message regarding an emergency situation, a communication broker (control room) which receives the alert message and determines the optimum course of action, and a receiving party (e.g. a unit dispatcher, or dispatched party such as a first responder unit) whom the communication broker contacts to direct for appropriate and timely response to the emergency situation.

FIG. 1A illustrates the information flow in a traditional system, from a sender such as a person in need 110 to the control room 120 which is manned by a human operator/dispatcher, and from the control room 120 to a receiver such as field units being dispatched 130. Human expertise and computer aided dispatch systems evaluate the collected information to support the decision-making process at the control room 120, to determine which dispatched unit or first responder 130 to activate and what information to provide them.

Figure 1B:
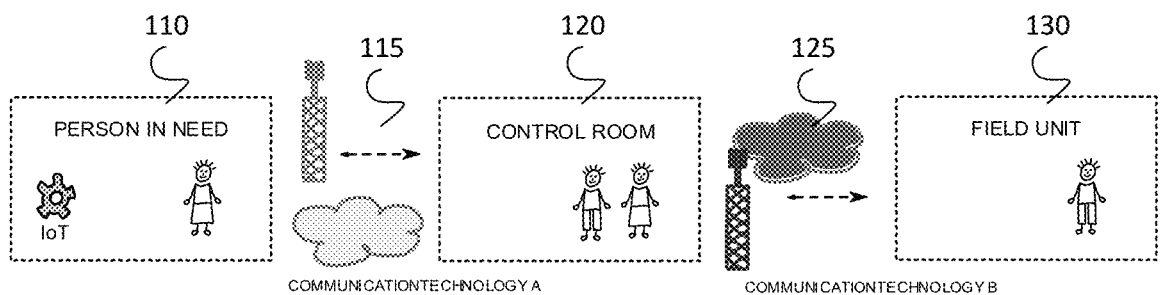

As technology has progressed, numerous different communication technologies 115, 125 are now used to access a control room 120 and to dispatch different units, as illustrated in FIG. 1B. The technology may vary from narrow band to broadband communication or may support differing types of content and other communication (audio, video, text, etc.). Additionally, the capacity for broadband data transmission between recent generations of mobile personal devices (e.g., via 4G and 5G networks) has increased dramatically. This capability can support a basic direct information exchange 135 (usually, voice) between a person in need 110 and a first responder unit 130, as illustrated in FIG. 1C.

While the control room 120 is likely to be equipped to receive and comprehend a message in any available form, the dispatched unit 130 might be far more limited in what messages they can receive, as a more versatile communication system would be larger and would undermine simplicity and hinder mobility. In most cases heretofore known, information gathering (the input 115 to the control room 120) is typically limited to voice communication, whereas dispatching (the output 125 from the control room 120) leverages voice and data communication services. Since technology evolves over time, the information input 115 and output 125 may utilize different technological means. Even if there is a general trend towards unified IP communication, the pace of development at both ends may be different, leading to an inhomogeneous infrastructure of different protocols and capabilities.

Therefore, in a conventional system, a traditionally manned control room 120 still remains the required link between the transmitting person in need 110 and the receiving dispatched unit 130, to decipher and relay each message with the human operator/dispatcher manually interpreting as necessary. This unnecessarily ties up human resources that might be needed elsewhere. Additionally, although modern communication infrastructures (e.g. ESINet) and recent standardization (in the context of NG911) also allow the sharing of multimedia information such as images, video, and text with the control room 120 or even with a sufficiently equipped first responder 130, such information may overwhelm human call-takers, dispatchers, and first responders.

Figure 1C:
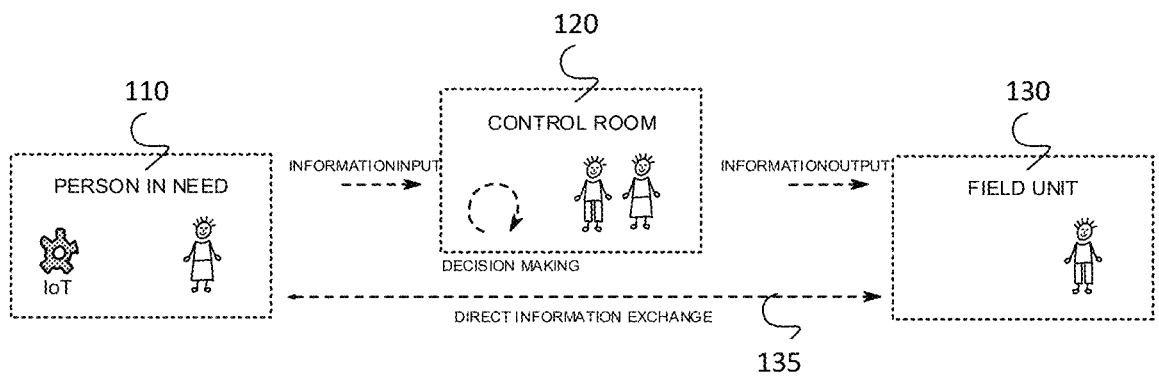

Turning now to FIGS. 2A-2D, these figures schematically illustrate the general incorporation of the CRMB in accordance with one exemplary embodiment of the present invention, into a traditional system such as illustrated in FIGS. 1A-1C. Briefly, the system operates to broker mission critical telecommunication transmitted between a sender 110 and a receiver 130 having disparate telecommunication media compatibilities. In this embodiment, the receiver 130 may not only be a first responder of another dispatched unit, but may also be the unit dispatcher itself. The system employs a mediation portion 10 which is programmably implemented to execute on one or more processing platforms for receiving a message from the sender in a first telecommunication medium. The mediation portion 10 further executes to adaptively generate a transformed message in a second telecommunication medium that is selected to be ascertainable to the particular communications resources available to the receiver 130. The mediation portion 10 thereafter actuates delivery of the transformed message to that receiver 130.

The system also employs an interpretation portion 20 which is programmably implemented to execute on one or more processing platforms responsive to the mediation portion 10. The interpretation portion 20 executes to support the mediation portion 10 by interpreting and thereby reducing the data contained in the message received from the sender 110 to its essential knowledge data content, as detected in accordance with certain mission critical criteria suitably predetermined for the given public safety response/dispatch application. In doing so, the interpretation portion 20 preferably generates a knowledge graph of the extracted essential knowledge data. The interpretation portion 20 preferably accesses an image interpreter service executable to detect at least one image object indicative of essential knowledge data. This essential knowledge data is then used to contextually identify the detected image object with respect to the predetermined mission critical criteria in the knowledge graph.

The system further employs a routing portion 30 which is programmably implemented to execute on one or more processing platforms responsive to the mediation portion 10. The routing portion 30 executes to support the mediation portion 10 by determining the telecommunication media compatibilities of the receiver (and of the sender, to the extent such compatibilities are not already apparent or determined from the incoming message). Based on that determination, the routing portion 30 selectively sets the second telecommunication medium needed for the transformed message to be ascertainable at the particular receiver's end.

The resulting system thus serves to manage message interpretation and/or validation based preferably on suitable semantic technologies, using the interpretation portion 20. The mediation portion 10 manages data aggregation and/or filtering of message content and intelligently routes and delivers messages based preferably on a domain specific rule engines, for example, using the routing portion 30.

This exemplary embodiment of the present invention enables the automated control room 120 to serve a communication patching function, bridging the communication gap between the person in need 110 and the dispatched unit 130. As a result, essential mission critical communication between the sender 110 and receiver 130 occurs as if they were communicating directly, despite communication incompatibilities that would otherwise be insurmountable without human-assisted intervention. The system provides the intelligent communications brokering needed to bridge the incompatibilities by way of the automated control of the mediation portion 10, interpretation portion 20, and routing portion 30.

Figure 2A:
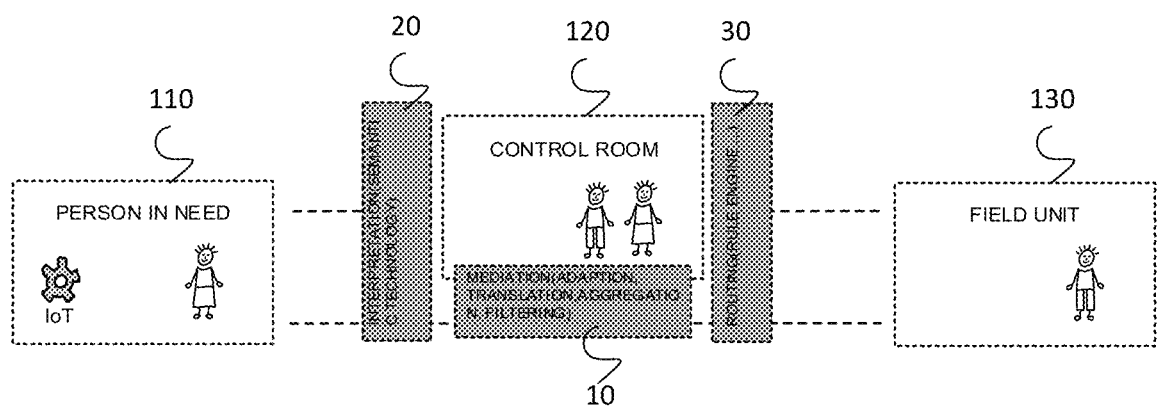
FIG. 2A is a diagram illustrating interactions of parties in a dispatching system in accordance with an exemplary embodiment of the present invention.
Figure 2B:
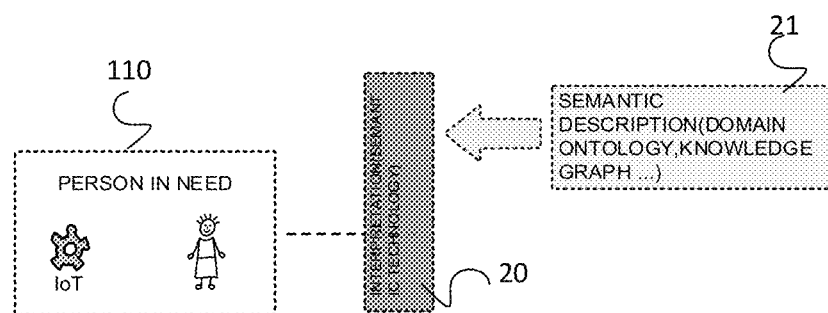
FIG. 2B is a diagram illustrating interactions of an interpretation portion of the embodiment illustrated in FIG. 2A.

FIG. 2B schematically illustrates the interactions of interpretation portion 20, which provides the extraction of essential knowledge content from a message sourced from a person in need 110, or in some cases an IoT device. Interpretation portion 20 preferably employs any suitable semantic technologies known in the art, and utilizes access to semantic descriptions 21, such as domain ontologies or knowledge graphs. Such semantic descriptions 21 are known in the art and may be provided by a third party.

Figure 2C:
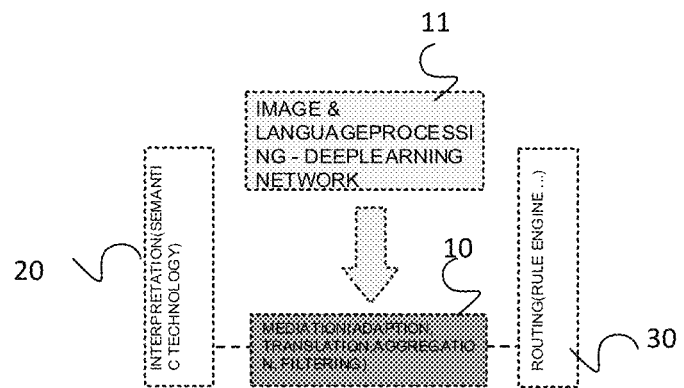
FIG. 2C is a diagram illustrating interactions of a mediation portion of the embodiment illustrated in FIG. 2A.

FIG. 2C schematically illustrates the interactions of mediation portion 10, which interacts with the interpretation portion 20 and the routing portion 30 as needed to transform an incoming message. The mediation portion 10 preferably integrates AI-based image and language processing, preferably through a deep learning network 11, to perform data mediation on information received, thereby supporting the different communication media and technologies used by the sender 110 and receiver 130.

Figure 2D:
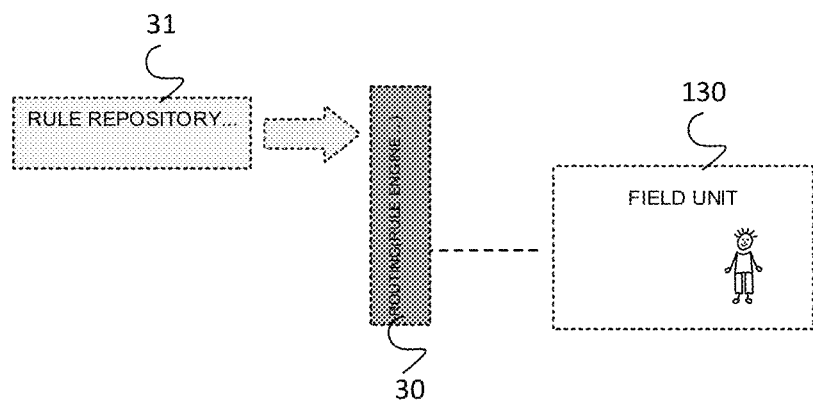
FIG. 2D is a diagram illustrating interactions of a routing portion of the embodiment illustrated in FIG. 2A.

FIG. 2D schematically illustrates the interactions of routing portion 30, which assesses the communication capabilities at the receiver 130 side. As noted, the receiver 130 may be a first responder unit/dispatched unit, or even a unit dispatcher station/console. The routing portion 30 receives annotated data as input from the mediation portion 10, and selects suitable parameters such as the proper communication channel by which to transmit transformed messages, the communication media for the message to be transformed to, or the like. The routing portion 30 does so based preferably on a predetermined rule repository 31, and preferably implements machine learning measures to enhance or adapt the selection of optimal or most appropriate routing options for the transformed message.

Figure 3:
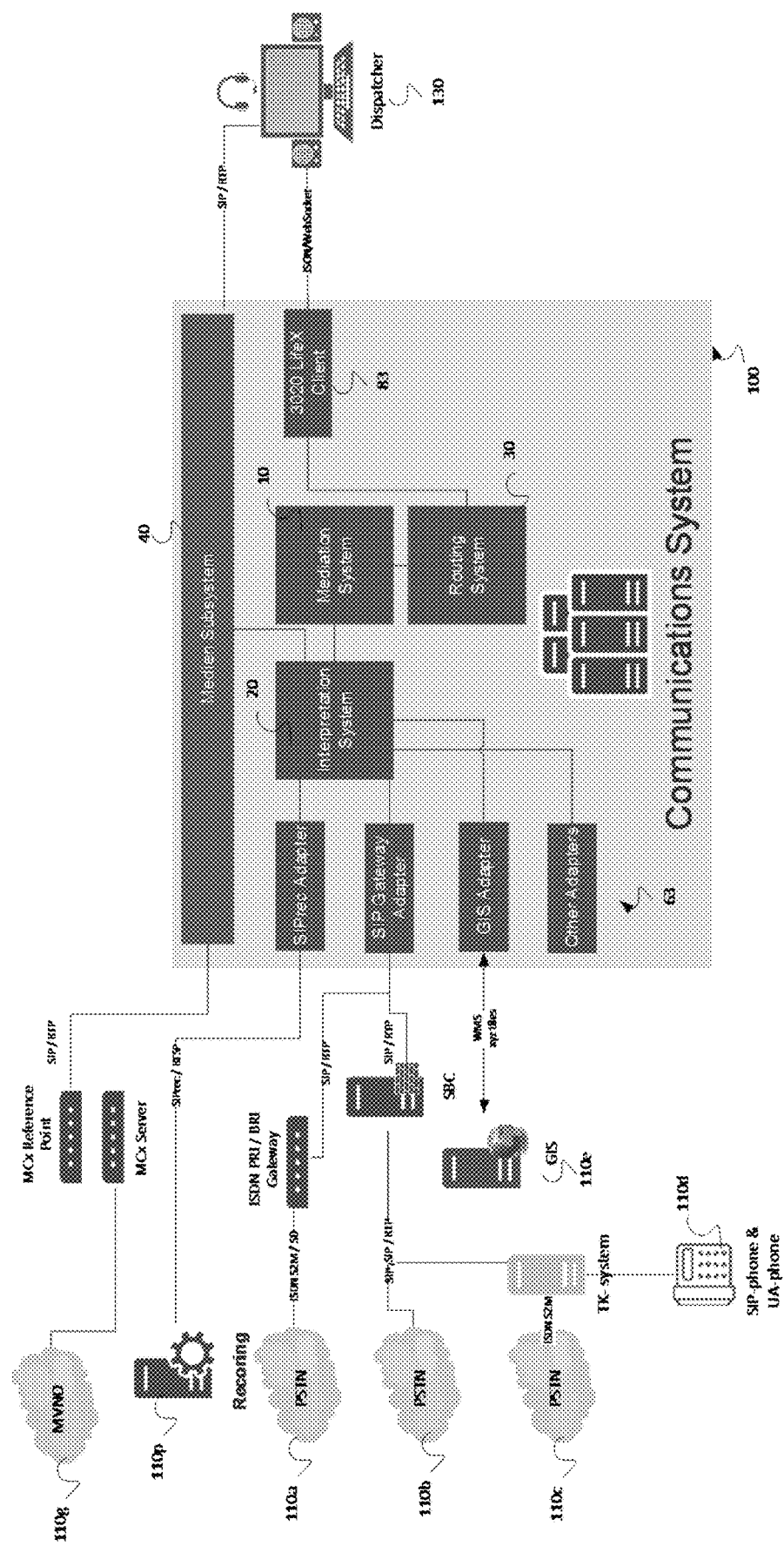
FIG. 3 is a block diagram illustrating a system for brokering communications, in accordance with an exemplary embodiment of the present invention.

FIG. 3 illustrates the mediation portion 10, interpretation portion 20, and routing portion 30 as implemented within an overall communication system 100. The communication system 100 also includes: a median subsystem 40, which in this example may be an intermediary system and interface adapter(s) for the exchange of mission critical data with first responders, for example; a client interface 83 to facilitate a communications link with a receiving dispatcher 130; and, adapters 63 of various configuration and format to facilitate communication with outside senders 110. These senders 110 can include telephones 110*a*, 110*b*, 110*c* operating over a public switched telephone network (PSTN) via various routes; a voice-over-internet phone 110*d* such as a Session Initiation Protocol (SIP) caller; and a geographic information system (GIS) 110*e* such as a Global Positioning System. Additionally, in this example application, a recorder 110*f* is connected with the system to send and receive recordings. Furthermore, in some embodiments, first responders employ a mobile virtual network operator (MVNO) system 110*g* which is connected specifically with the median subsystem 40, both to utilize the system therethrough and to directly communicate with the dispatcher 130.

Figure 4A:
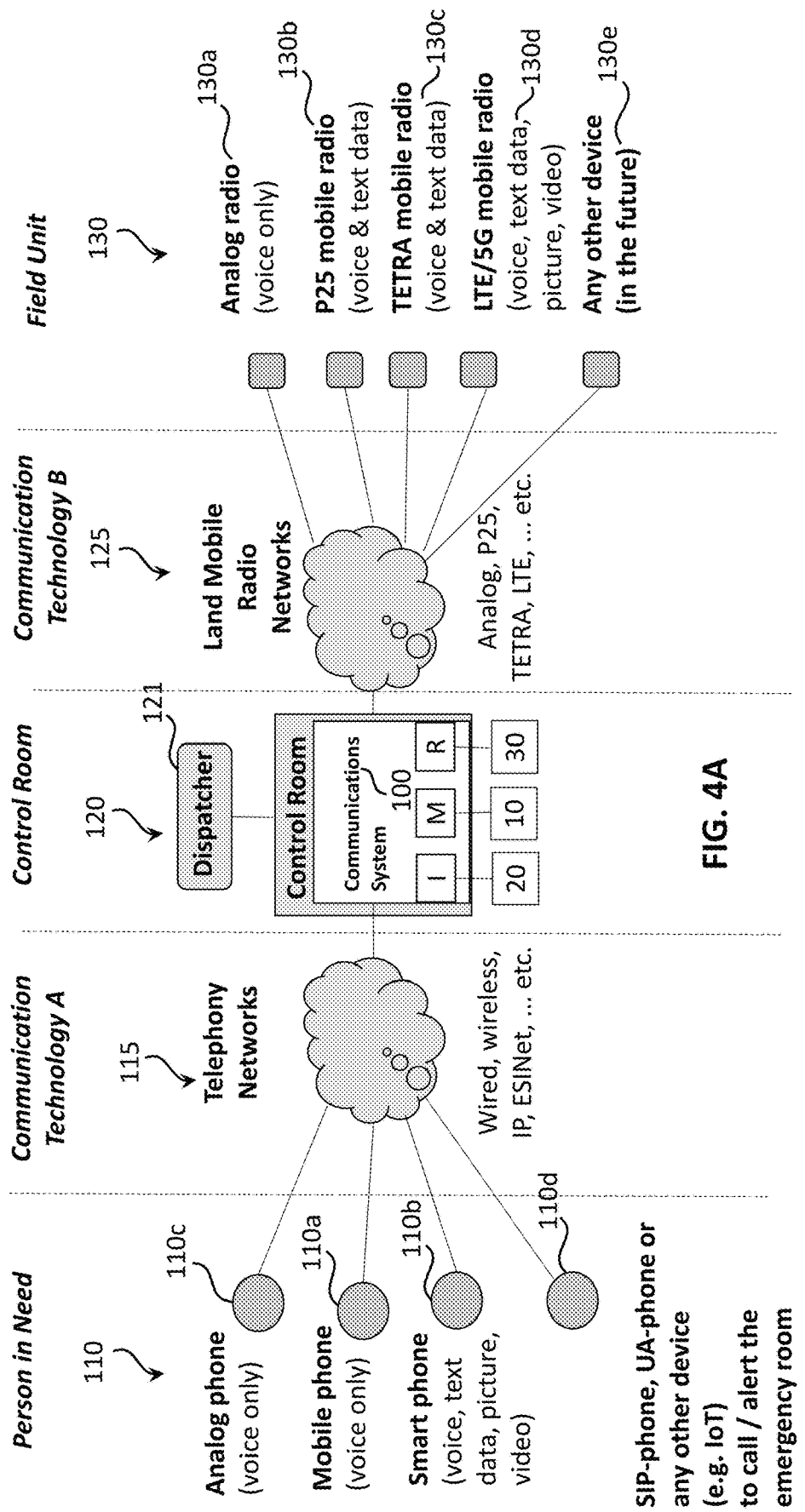
FIG. 4A is a schematic diagram illustrating examples of variously equipped senders and receivers that may be adaptively patched for intercommunication during operation of a system for brokering communications in an emergency dispatch context, in accordance with an exemplary embodiment of the present invention.

FIG. 4A illustrates operation of a communication system 100 having a mediation portion 10, interpretation portion 20, and routing portion 30 in an emergency response system application, with various groupings of interacting parties shown. Potential senders 110 in this context may include persons in need or sufficiently smart machines/devices, who/which make use of equipment that may include a mobile phone 110*a*, a smartphone 110*b*, an analog phone 110*c*, and a voice-over-internet phone or IoT-enabled device 110*d*, among others. Potential receivers 130 in this context, meanwhile, may include field units or even a dispatcher/dispatcher console, who/which make use of equipment that may include an analog radio 130*a*, a P25 mobile radio 130*b*, a Terrestrial Trunked Radio (TETRA) mobile radio 130*c*, an LTE/5G mobile radio 130*d*, and other devices 130*e* that may be developed in the future. Each sender interacts with a corresponding communication technology or network 115, which for convenience of illustration are not visually distinguished in FIGS. 4A and 4B. Likewise, each receiver interacts with a corresponding communication technology or network 125. In the example illustrated, the mobile phone 110*a*, analog phone 110*c*, and analog radio 130*a* support only voice (audio) media communication, and the P25 radio 130*b* and TETRA radio 130*c* support voice and text, while the smartphone 110*b*, IoT-enabled device 110*d*, and LTE/5G mobile radio 130*d* support a variety of media communication types including voice, text, image, and video.

Using their respective networks, each sender and receiver communicates with control room 120, and more specifically with communication system 100. Also linked with communication system 100 is a dispatcher 121. While in FIG. 3, the dispatcher was shown as a receiver 130, in the context of FIG. 4 the dispatcher may be both a receiver as to potential senders 110, and a sender as to potential receivers 130.

Figure 4B:
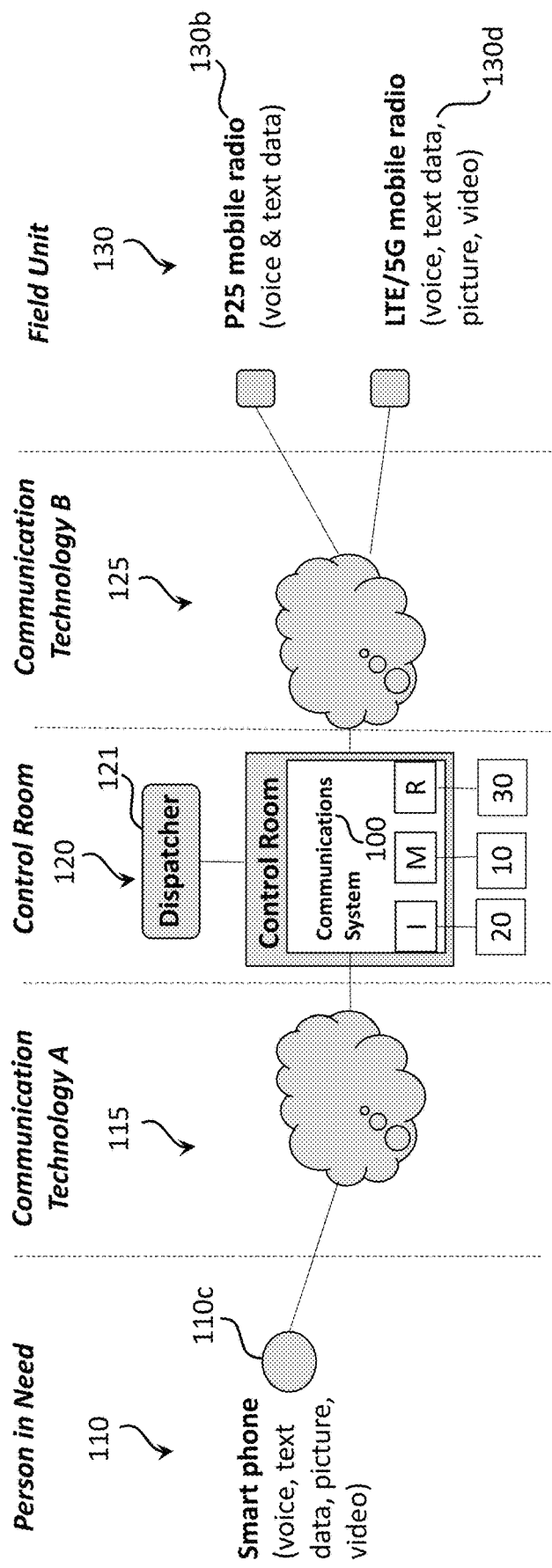
FIG. 4B is a schematic diagram illustrating the patching of one sender to one or more disparately equipped receivers during operation use of a system an example interaction of the components of the system illustrated in FIG. 4A, in accordance with an exemplary embodiment of the present invention.

FIG. 4B illustrates an exemplary interaction of sender, receiver, and dispatcher, operating through the system illustrated in FIG. 4A. A person in need with a smartphone 110*c* calls the control room 120 and reports a vehicle collision. This call transfers through a phone/data network 115 to the communication system 100. The emergency call taker/dispatcher 121 receives the call via the communications system 100 and asks to be sent a picture of the scene, which the person in need sends in much the same manner as the phone call. The dispatcher 121 then dispatches the appropriate units (130*b* and 130*d*) to the scene, prompting the system to patch their talk groups with the call. The received picture is processed by the communication system 100, whose mediation portion 10, interpretation portion 20, and routing portion 30 cooperatively execute to identify relevant mission critical information in the image. This is provided as text output for the receiver(s) without image rendering capability. For example, the P25-equipped unit 130*b* receives the relevant mission critical information via SDS text and voice (text-to-speech), as P25 radios are not capable of displaying images. The LTE/5G-equipped field unit 130*d*, being capable of voice, text, and picture, receives both the picture and, optionally, also the text and/or voice (text-to-speech) information that the P25-equipped field unit 130*b* receives. This information aids the field units 130*b*, 130*d* to make suitable preparations prior to arrival.

Once the LTE/5G-equipped field unit 130*d* arrives at the scene, the unit can capture additional images and transmit them to the system, which can be processed in much the same manner and provided as SDS text and/or voice to the other field unit 130*b*, providing further relevant mission critical information. (It is noted that field unit 130*d* operates as a sender in this context.) This information is also provided back to the emergency dispatcher 121 which may, based on the additional information, dispatch other field units or execute other necessary tasks to manage the incident.

Example embodiments of the mediation portion 10 and its operations will now be described in greater detail. The mediation portion 10 mediates communication amongst the public and first responders or unit dispatchers/operators, even those equipped with communications resources supporting disparate communication media and/or configured for disparate communication technologies. The mediation portion 10 obtains suitably interpreted data (according to the given mission critical criteria) from the interpretation portion 20 and performs data aggregation or filtering where applicable. This aggregation and filtering is performed by a suitable deep learning network, which learns to recognize domain-specific patterns (e.g. hazmat plates) that may be found, for instance, in photographic images taken on-scene by a sender. Various deep learning networks are known in the art, and include but are not limited to TENSORFLOW and PYTORCH.

Such deep learning models are helpful in extracting relevant information from images contained in messages from senders, which may be translated into simple text added as metadata to a well-defined exchange format. The same applies to information extracted from voice calls from senders utilizing natural language processing to automatically analyze and represent human language. The extracted information may include, for example, domain specific keywords, or other relevant information detected from ambient noise (e.g. voice analyzing tools may be useful in heart disease diagnosis).

In essence, the mediation portion 10 preferably applies trained artificial intelligence to extract particular information from the interpreted data of the interpretation portion 20, which supports the decision-making process in the control room and/or which provides the first responder with important information when properly transmitted thereto with the aid of the routing portion 30. In addition, in certain embodiments, the mediation portion 10 generates alerts directly sent to a dispatcher or call taker in the control room 120 if it detects an abnormality, so as to raise attention to a critical situation that might require human intervention. For example, as senders, IoT devices may raise attention to a critical situation that might require human intervention, such as Advanced Auto Crash Notification (AACN) which enables a vehicle to initiate an emergency call after a crash.

Example embodiments of the interpretation portion 20 and its operations will now be described in greater detail. When a sender transmits information in a natural language form, text analysis, natural-language processing, and semantic technologies are applied by the interpretation portion 20 to pre-filter and annotate relevant information. The development of such a system requires a knowledge base steered by semantic descriptions: e.g. domain ontologies or knowledge graphs.

A knowledge graph includes one or more of concepts, synonyms, and relations, which represent domain knowledge in machine-processable form. Example knowledge graphs will be described further herein.

The interpretation portion 20 allows the integration of various data into a unified information model. This system therefore captures data and its metadata in appropriate formats, applies domain and data specific algorithms, and exposes managed data and raises alerts to the other portions of the system in well-defined exchange formats.

The interpretation portion 20 utilizes semantic technologies to tackle the challenge of different information types and sources to support content-based (semantic) and/or formal (syntactic) analysis, with an appropriate content descriptive representation of essential knowledge data generated by each analysis. The modular implementation of the system allows the integration of third-party data sources or knowledge graphs for particular mission critical criteria and mission context. Information sources can be various, e.g. test calls, IoT/sensors, bridges, timers, social media feeds, or multimedia calls.

Preferably, the learning process also accounts for reliability of the received information and trains the system to recognize and dismiss pranks, hoaxes, and satire. Additionally, the interpretation portion 20 is preferably enabled to interpret images by identifying relevant objects within an image.

Suitable deep learning algorithms known in the art are used to implement this data analysis. For image analysis in particular, these algorithms include but are not limited to the GOOGLE CLOUD VISION AI Service, which is used to interpret image content.

Operation and capabilities of the GOOGLE CLOUD VISION AI Service are detailed at https://cloud.google.com/vision/, with guides for the object detection feature found at https://cloud.google.com/vision/automl/object-detection/docs/how-to. In summary, the AUTOML Vision Object Detection feature is able to detect objects and their location in the image with the help of artificial intelligence based on training data. The training data includes sample images of objects, and a description file which identifies the objects within the images with bounding boxes and corresponding object annotations. This process is described in "Formatting a training data CSV," found at https://cloud.google.com/vision/automl/object-detection/docs/csv-format. By processing training images in which certain key objects of note, or certain of their properties/characteristics, are pre-identified, the algorithm is able to build up a set of knowledge objects. Image interpretation then uses this information to detect the key objects in images, preferably then providing object annotations, with probabilities, for the benefit of other systems and human users.

The service may be trained with custom training data, as described in "Training models," found at https://cloud.google.com/vision/automl/object-detection/docs/train. Custom training data is preferable to teach the interpretation system 10 more specifically to identify mission critical criteria. As one example, in the context of first responder dispatching, the image interpretation service is preferably supplied with training data identifying, for example, hazmat labels, signs, and vehicle license plates, as well as the content of each.

The full documentation of the GOOGLE CLOUD VISION AI Service existing as of the filing of this application, found at https://cloud.google.com/vision/ and its sub-domains, is incorporated herein by reference.

Example embodiments of the routing portion 30 and its operations will now be described in greater detail. The routing portion 30 is preferably configured to implement a reasoning formalism for annotating data. The routing portion 30 includes a reasoner which uses available knowledge (e.g. a data receiving or rendering capacity of the receiver) and rules in the rule repository 31 together with case-specific or incident-specific knowledge to decide which information will be forwarded to the receiver.

Preferably, the routing portion 30 provides information about the rule and the reasoning process in order to reconstruct reasoning results that lead to a specific message routing decision. This not only satisfies logging requirements but is used as feedback to optimize the reasoning process.

In the case of multiple receivers, the routing portion 30 determines the communication particularities/capabilities of each receiver, and prioritizes amongst them for delivery of the transmitted message. Preferably, it is assumed that the lowest common denominator, in terms of the communication capabilities available to all recipients, is the capability to render audio content (of which speech or voice is a notable type). Audio content may also serve as a preferable default selection in the event that the media compatibility of a receiver cannot be determined.

It is noted that a mission critical portion(s) of the message content, or the essential knowledge content of the message, as received from the sender, must be preserved in the transformed message and delivered to the receiver. Such mission critical content is also preferably recorded for further reference in a content descriptive representation that provides qualitative description of that content. This permits review and suitable rendering of the essential knowledge contained in the original message's information, both to follow up on the communication and as potential additional training data.

In an example application, communication exchanges such as talk groups and phone calls, operating on different frequencies, networks, media, and/or protocols, are "patched together" into a larger, shared exchange. This creates a "virtual" communication group that links senders and receivers belonging to these talk groups and calls. It is frequently desirable that these senders and receivers be merged together, or patched, when information is to be shared, as devices in separate talk groups or on separate phone calls may not otherwise be able to share mission critical information with each other.

Talk groups are generally known in the digital media radio (DMR) art as a way of grouping numerous radio IDs into a common digital communication group using various grouping criteria. For example, a set of frequencies may be collectively assigned to the talk group to define those communication frequencies employed by talk group members. A talk group thus provides a means of organizing radio traffic specific to the DMR users with interest in common subject matter, while not being bothered by other radio traffic on a DMR network that they are not interested in hearing. In certain applications, talk groups may be defined according to geographic and political regions as well as for special interest groups. Additionally, any group of interacting DMR users may organize a talk group such that they may collectively monitor and take part in the communication traffic passing therethrough, and avoid the inconvenience of individually communicating with each of the other users. In practice, a talk group is defined within a particular DMR network, and is additionally assigned an identifying number that is unique to the network (but not necessarily to all DMR networks).

The present system enables patching not only between different talk groups, but between various types of senders and receivers having support for different communication protocols, such as between analog and digital radio or between radio and telephone calls (e.g. wired, wireless, and multi-media), by mediating between different audio codecs. Additionally, for example, when patching a broadband radio talk group (e.g. LTE or 5G) to a standard digital radio talk group (e.g. TETRA or P25), the broadband radio group is frequently enabled to transfer images, but the standard digital radio group is enabled to transfer only text and audio. Here, the mediation portion 10 calls on the interpretation portion 20 to interpret the image content information, and upon the routing portion 30 to find and set the optimum (or preferable, at least) communication medium for routing a given message's content information to the target standard digital radio group. The mediation portion 10 transforms the message while preserving the essential knowledge, or mission critical content, of the received information. Thus, the system transforms the message to a text message constructed to contain the essential knowledge elaborated in text form, and actuates delivery of the text message to the target standard digital radio group.

FIG. 5 illustrates a process flow within the mediation portion 10 when mediating and transforming a message, according to one embodiment of the invention. The illustrated embodiment assumes patching between talk groups for convenience of description, but those of skill in the art will be able to apply these disclosures to link variously equipped senders and receivers, including but not limited to patching a telephone call sender with one or more radio talk groups receivers, patching multiple telephone calls, or patching a social media feed with a talk group.

In the illustrated embodiment, the mediation portion 10 includes a talk-group patch service 13. At 501, a message with image content is received and processed by the talk-group patch service 13.

At 503, it is checked whether patching is active. If not, the talk-group patch service 13 terminates the flow immediately as no transmission is exiting the immediate talk group. (It is noted that other subportions of the mediation portion 10 may still be operating to check for other conditions where mediation is necessary.)

At 505, a list of patched talk groups is retrieved. One receiving talk group is selected, and it is checked at 507 whether the sending talk group is in the same type of network (having matching capabilities). If so, it is checked at 509 if other data patching between groups is already implemented and active for this network. If so, the network may be entrusted to manage the message handoff, so the talk-group patch service 13 immediately terminates the flow. If not, the talk-group patch service 13 sends the message to the other talk groups over available messaging services and then terminates the flow.

If there are groups not in the same network, the talk-group patch service 13 communicates with the interpretation portion 20 to retrieve a knowledge graph at 513, and communicates with the routing portion 30 to determine the preferred communication medium for the second talk group (that is, the receiver) at 515. Example processes for each portion will be described with respect to FIGS. 6 and 7, respectively.

At 517, it is checked whether the receiver talk group prefers image content; that is, whether the receiver talk group has a preferred, image-capable messaging service 65a. If so, the original image is sent over the image-capable messaging service 65a at 519.

If the receiver talk group does not supports or prefer image content, at 521, it is checked whether the receiver talk group supports and prefers text content; that is, whether the receiver talk group has a preferred, text-capable messaging service 65b such as SDS. If so, the knowledge graph content is converted to text at 523, which is then sent over the text-capable messaging service 65b at 525.

The talk-group patch service 13 processes this conversion by a set of rules 11 (see FIG. 2C), which can be static rules or some form of artificial intelligence technology. These rules determine the transformation of image data to the SDS text message media, selecting the most relevant information and, in some embodiments, producing a natural language output. In an illustrative example, a knowledge graph depicted in FIG. 6B is converted to the text: "Image with the following content has been sent to this talk-group: Image shows a truck with a Flammable Gas Class 2 sign and a hazmat label with the words 'toxic hazard' and 'danger', with license plate GF-465-JX." Details of the generation of this knowledge graph will be described further herein.

If no communication medium of the receiver talk group supports either text or image content, at 527, it is checked whether the receiver talk group supports and prefers audio content; that is, whether the receiver talk group has a preferred, audio-capable messaging service 65*c*. If so, the knowledge graph content is converted to text at 529 much as it would have been at 523. However, additionally, at 531, a text-to-speech engine synthesizes the text into speech, which is then sent over the audio-capable messaging service 65*c* at 533.

In summary, the transformation of image messages in the mediation portion 10 proceeds as follows: the communication media compatibility of a patched group is checked, and if it is compatible with image transmission, the image will be transferred without further processing. If the patched group cannot transfer images, but can transmit text, the interpretation portion will interpret the image as described above, and its result will be transmitted in text format. If the patched group cannot receive images or text, the text will be further transformed to automatically generated, synthesized speech.

This order is due to the order of checks 517, 521, and 527, and is preferred in many contexts. Generally, having the original image is ideal, while text is less ideal but still more convenient to review than audio; a device is more likely to have automatic means of preserving received text (or image) content for repeated review than audio content. Also, emergency conditions may be expected to be loud, distracting, and not conducive to review of an audio message. However, it is within the scope of the invention that another order may be suitable in certain applications, such that, for example, audio might be a preferable format to text. In such a case, check 527 would come before check 521. Additionally, a particular talk group might be capable of receiving text yet prefers audio, and the routing portion 30 supplies this instruction.

At 535, regardless of how the message was sent (or not sent at all), it is checked whether additional talk groups have not received the message content in some form. If so, this flow will be repeated from 515 with a different talk group, until all patched groups have been examined and the content has been transmitted in the selected format (e.g. image, text, or audio) for each group.

FIG. 6 illustrates a process flow within the interpretation portion 20 when interpreting an image, according to one embodiment of the invention. An image interpreter service 23 of the interpretation portion 20 receives and processes a request to interpret an image at 601. At 603, it requests and receives an interpretation of the image from an image interpreter adapter 25, and at 605, it converts the interpretation to a content descriptive representation, such as a knowledge graph. It then outputs the knowledge graph at 607.

The image interpreter adapter 25 serves as an intermediary between the system and an external third party interpreter engine 27 such as the GOOGLE CLOUD VISION AI Service. The image interpreter adapter 25 receives and processes a request from the image interpreter service 23 at 611. At 613, the image interpreter adapter 25 sends credentials to the external interpreter engine 27 for authentication, and logs in. The image interpreter adapter 25 requests and receives an image annotation for the image from the external interpreter engine 27, and at 617 returns the relevant information to the image interpreter service 23.

The external interpreter engine 27 receives and processes a request from the image interpreter adapter 25 at 621. At 623, the external interpreter engine 27 analyzes the image and detects relevant objects within. According to various embodiments, the external interpreter engine 27 refers to training data 270 as part of this detection, or is trained in advance by the training data 270 to detect the relevant objects. At 625, the external interpreter engine 27 returns the detected object information to the image interpreter adapter 25.

It is noted that the external interpreter engine 27 may provide more information than desired. Either the image interpreter adapter 25, at 617, or the image interpreter service 23, at 605, therefore reduces the information content to the relevant details.

Figure 6A:
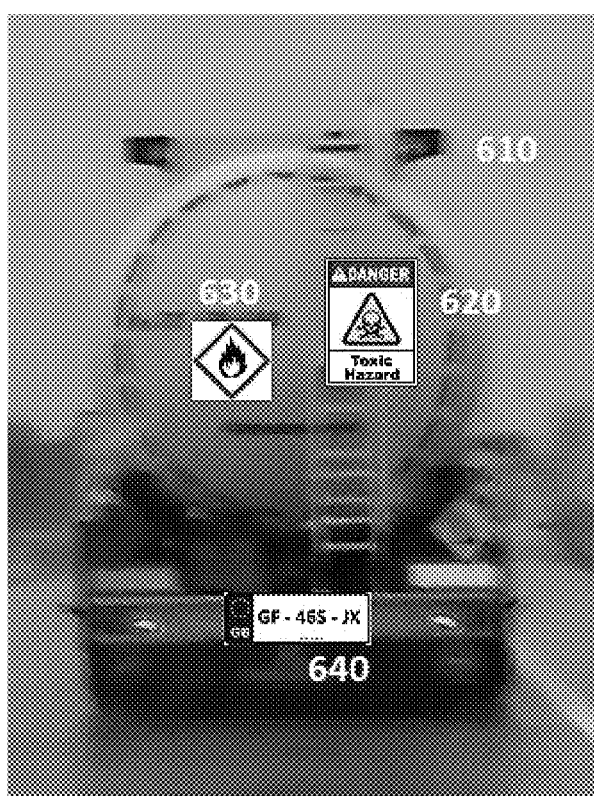
FIG. 6A is a depiction of an illustrative example of an image selected for interpretation, with highlighted image objects, in accordance with an exemplary embodiment of the present invention.

An example image for analysis is illustrated in FIG. 6A, with one illustrative knowledge graph resulting from interpretation of this image in FIG. 6B. Based on mission critical criteria represented by the training data 270, relevant objects in the example image are the truck 610 itself, a hazmat sign on the truck 620, a flammable liquid pictogram sign on the truck 630, and a license plate 640. The knowledge graph illustrated in FIG. 6B therefore represents these objects 610-640, along with their content where applicable.

Figure 7:
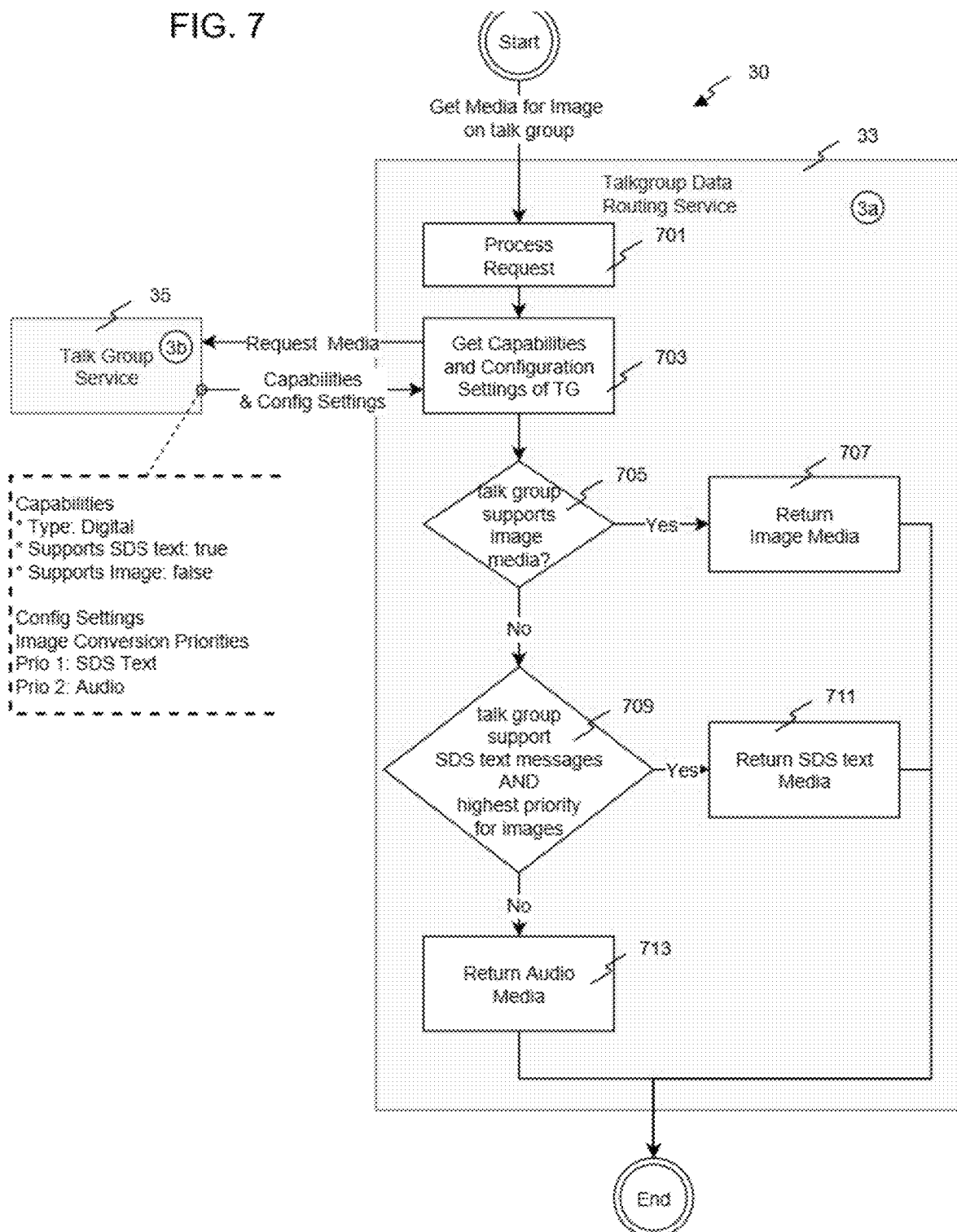
FIG. 7 is a flow diagram illustrating a flow of processes for medium determination in a routing portion, in accordance with an exemplary embodiment of the present invention.

FIG. 7 illustrates a process flow within the routing portion 30 when determining a communication medium, according to one embodiment of the invention. A talk group data routing service 33 of the routing portion 30 receives and processes a request to determine a preferred communication medium of a talk group at 701.

At 703, the talk group data routing service 33 requests and receives a set of capabilities and configuration settings from a talk group service 35 for the designated talk group. In one embodiment, the talk group service 35 includes a look-up table of one or more talk groups with their respective capabilities and settings, which is preferably kept updated by the talk groups. These settings preferably described not only the physical capabilities of the talk group but also preferences and priorities for various formats and communication mediums.

In some embodiments, a set of routing rules 31 (see FIG. 2D) are applied to determine the preferred medium from the preferences and priorities. The routing rules can either be a static set of rules or a suitable type of artificial intelligence technology.

In the illustrated embodiment, the rules are fixed as depicted. Specifically, at 705, it is checked whether the talk group supports image media, and if so, the routing service 33 selects an image communication medium at 707. Otherwise, at 709, it is checked whether the talk group supports text content and also whether this is the priority format for converted image content, and if so, the routing service 33 selects a text communication medium at 711. Otherwise, the routing service 73 selects an audio communication medium at 713.

It is noted that, while this routing service 33 and talk group service 35 are again described as specific to talk groups for convenience, those of skill in the art will be easily able to apply these disclosures to patching or linking other combinations of communications.

Figure 8:
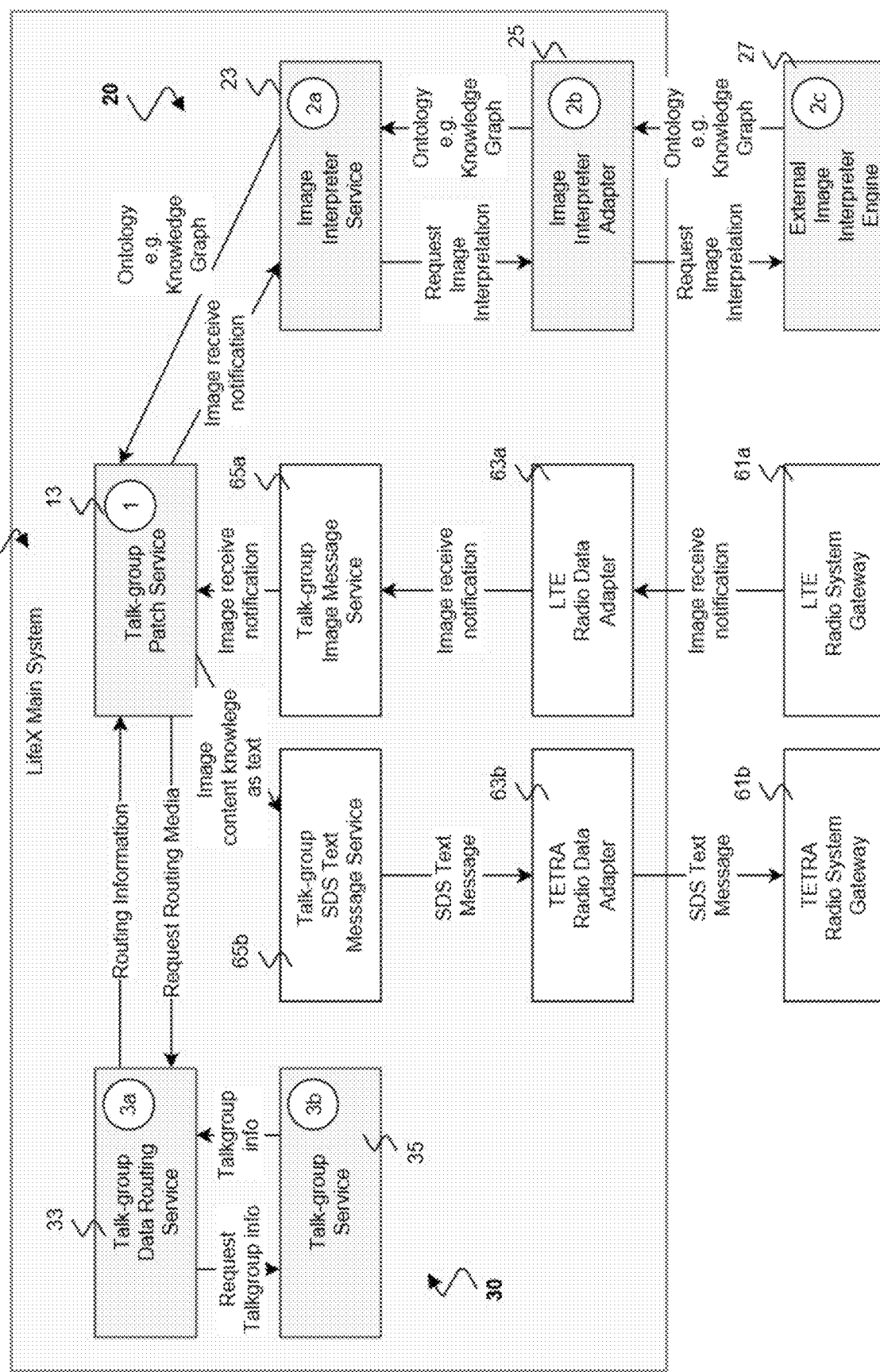
FIG. 8 is a flow diagram illustrating a flow of processes for brokering communications between patched talk groups, in accordance with an exemplary embodiment of the present invention.

FIG. 8 illustratively combines the flows of FIGS. 5, 6, and 7, in an example application of a talk group patching between an LTE system and a TETRA system. A message with an image is received from an LTE sender via an LTE radio gateway 61*a*, adapter 63*a*, and messaging service 65*a*. In this embodiment, the message is provided directly to the mediation portion 10. Following the mediation portion flow illustrated in FIG. 7, and the corresponding interpretation portion and routing portion flows illustrated in FIGS. 5 and 6 respectively, the interpretation portion 20 generates the knowledge graph, reducing the message to its essential knowledge data, while the routing portion determines the communication media compatibility of the receiving talk group (in this example, the TETRA system) and sets the communication medium to SDS text. The mediation portion 10 then generates a transformed SDS text message from the knowledge graph and actuates delivery through a TETRA messaging service 65b, adapter 63b, and radio gateway 61b to a TETRA receiver.

Figure 9:
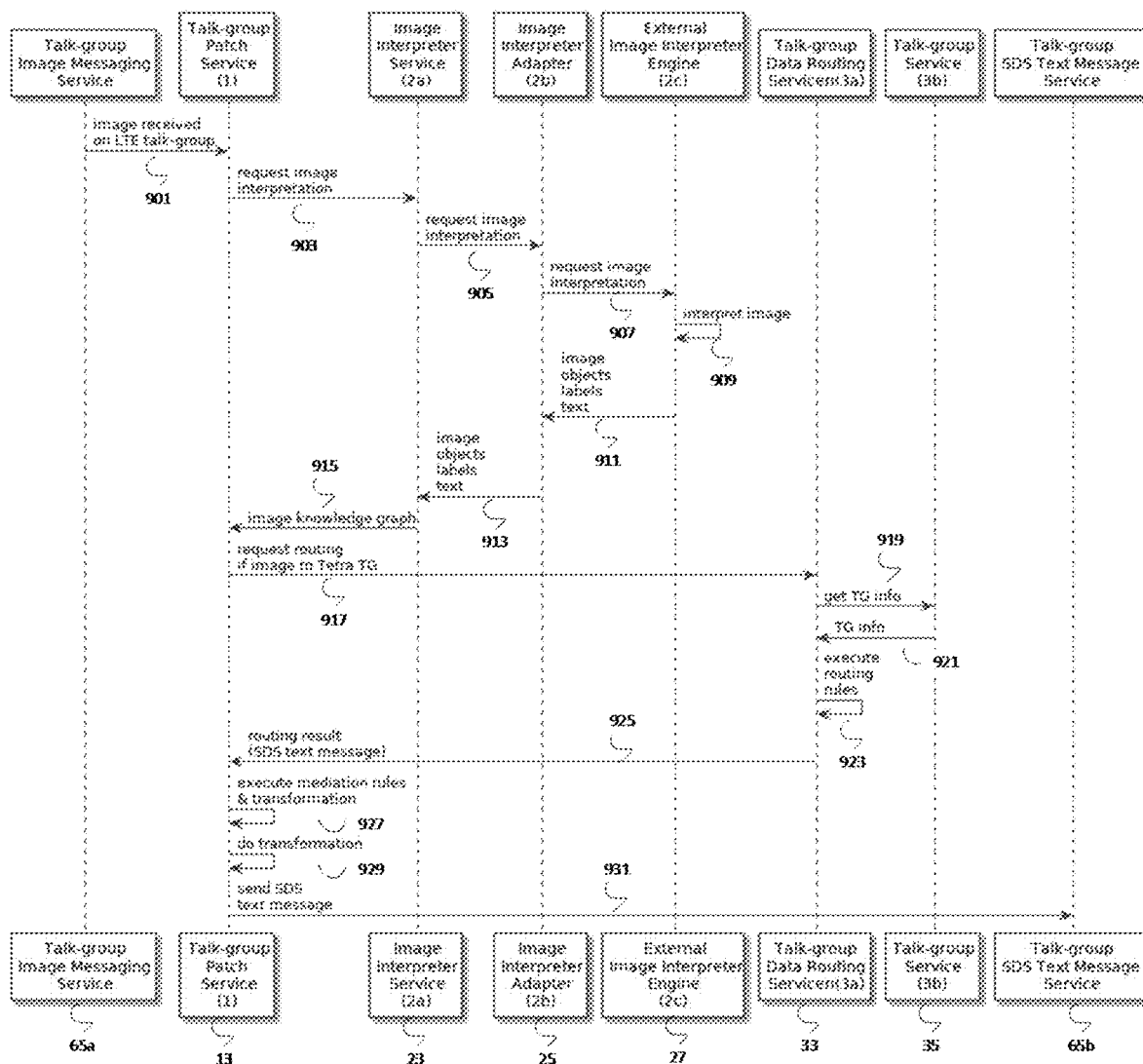
FIG. 9 is a block flow diagram illustrating a flow of interactions between components in an example application of the embodiment illustrated in FIG. 8.

A message flow corresponding to the process flow of FIG. 8 is illustrated in FIG. 9. At 901, the image is received from the LTE talk group image messaging service 65a at the patch service 13.

At 903, the patch service 13 requests an image interpretation from the interpreter service 23, which requests the image interpretation from the interpreter adapter 25 at 905, which requests the image interpretation from the external interpreter engine 27 at 907. The external interpreter engine 27 interprets the image at 909, returning the interpreted information back to the interpreter adapter 25 and interpreter service 23 at 911 and 913, respectively. The interpreter service 23 then reduces the interpreted information to an image knowledge graph at 915.

At 917, the patch service 13 requests an appropriate communication medium for routing from the routing service 33. The routing service 33 requests talk group information from the talk group service 35 at 919 and receives it at 921. The routing service 33 then executes the routing rules 31 at 923, and provides the result to the patch service 13 at 925.

At 927, the patch service 13 determines the preferred form of the transformed message, and at 929, it performs the transformation. It then sends the message to the TETRA talk group text messaging service 65b at 931.

In another example application, an emergency operator is provided additional information about an incident in the form of interpreted media data. The operator is involved in an emergency phone call conversation and adds web-chat media to the conversation, and receives an image of an incident scene from the incident reporter.

Figure 10:
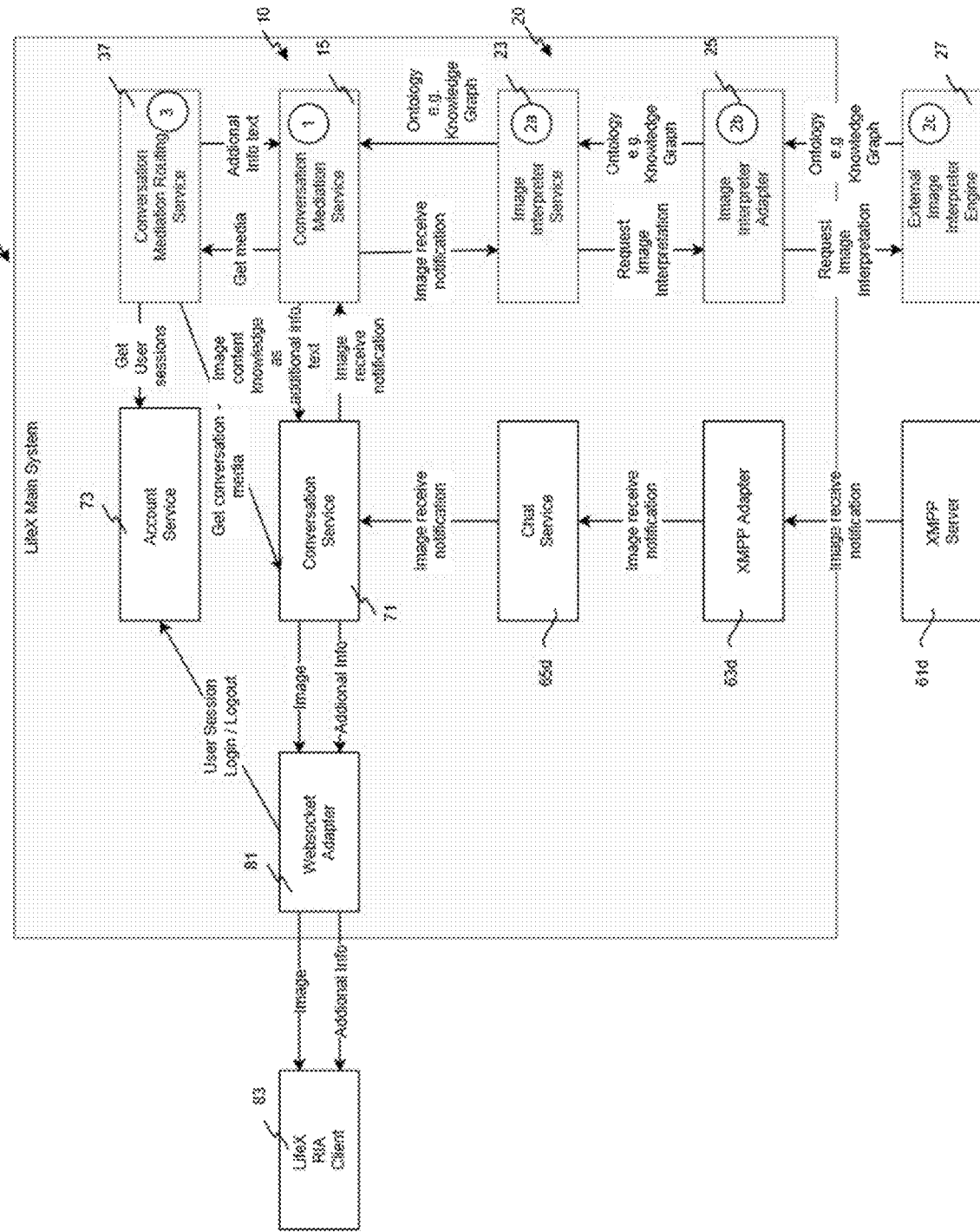
FIG. 10 is a flow diagram illustrating a flow of processes for brokering communications between a messaging service and an emergency operator, in accordance with another exemplary embodiment of the present invention.

In one embodiment suitable for this application, which is illustrated in FIG. 10, the mediation portion 10 includes a conversation mediation service 15, which contains the rules 11 (see FIG. 2C) on when to present and how to transform the knowledge about the media content to a conversation. This conversation mediation service 15 may operate similarly to the talk group patch service 13 illustrated in FIGS. 5 and 8, with suitable alterations which will be clear to those of skill in the art.

The interpretation portion 20 includes the same subportions as, and operates substantially identically to, the interpretation portion 20 illustrated in FIGS. 6 and 8.

The routing portion 30 includes a conversation mediation routing service 37 (see also FIG. 7), which determines the currently best media to transport the knowledge to the operator, based on media of the conversation managed by a conversation service 71, and user session information received from the operator during login and managed by an account service 73. For example, if the conversation has no audio content, or the operator has set a preference to receive knowledge data as text, the communication medium for the additional information is selected to be text media, which is displayed to the operator in the conversation. This conversation mediation routing service 37 may operate similarly to the talk group routing service 33 illustrated in FIGS. 7 and 8, with a notable difference being that it need not retrieve information from a talk group service 35 specific to the designated talk group.

In the illustrated embodiment, an image arrives in the system from a messaging system via an Extensible Messaging and Presence Protocol (XMPP) server 61d, XMPP adapter 63d, and chat service 65d, finally arriving at the conversation service 71. In prior systems, the conversation service 71 would simply attempt to provide the image to a receiver, the operator, via a websocket adapter 81 and client interface 83. However, before that happens, the image is interpreted and transformed as previously described. The resulting text or audio, whichever is determined to be the preferable communication medium, are provided to the conversation service 71, which then transmits said text or audio as additional interpreted data along with the original image to the emergency operator.

Figure 11:
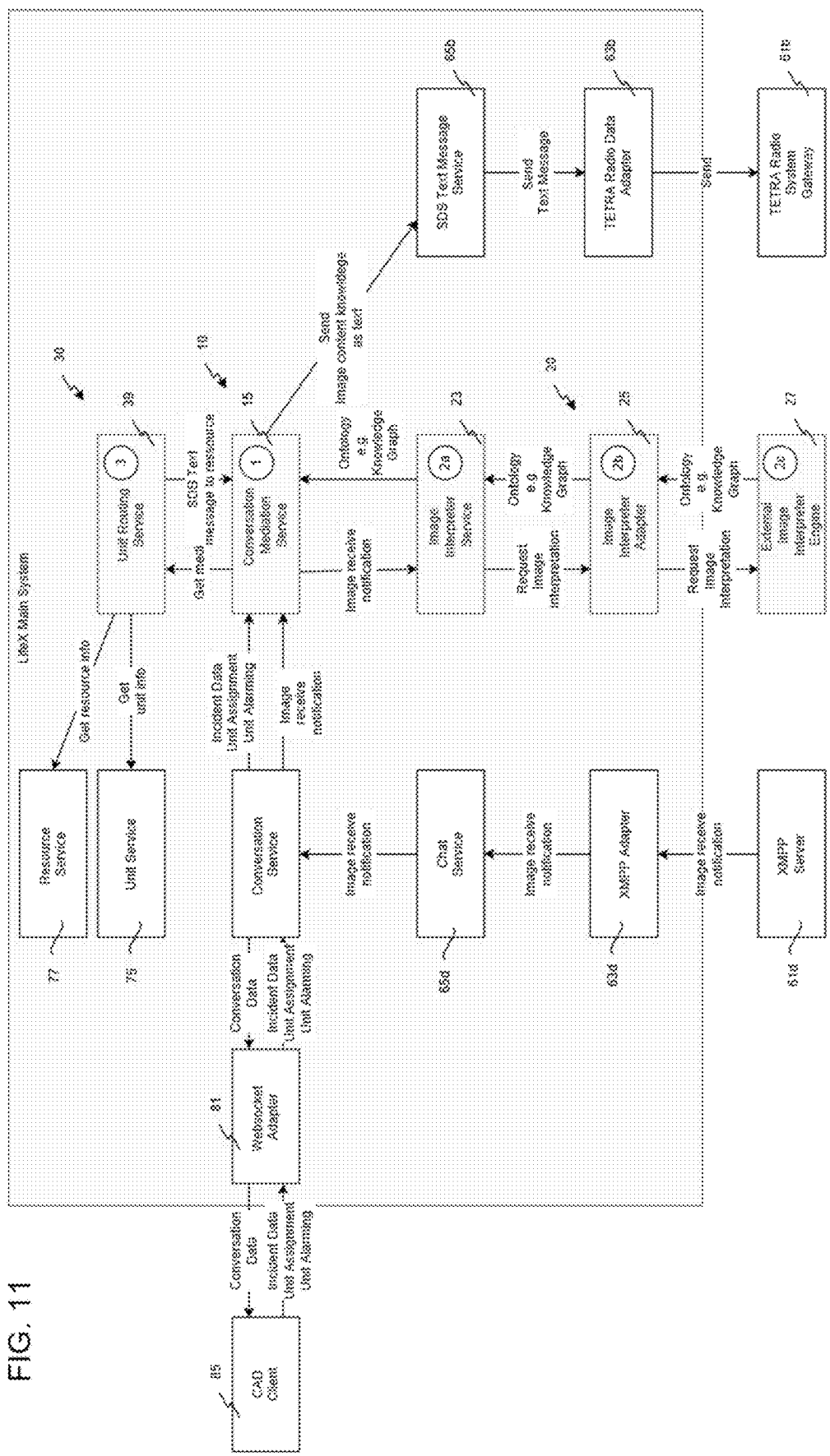
FIG. 11 is a flow diagram illustrating a flow of processes for brokering communications between a messaging service and a first responder unit, in accordance with yet another exemplary embodiment of the present invention.

In the above application, the emergency operator is a receiver. However, in another embodiment suitable for this application, which is illustrated in FIG. 11, the emergency operator may also be a dispatcher using a Computer Aided Dispatch (CAD) client interface 85. CAD is a known system and method of dispatching taxicabs, couriers, field service technicians, mass transit vehicles, and emergency services assisted by computer. It can be used to send messages to the dispatchee via a mobile data terminal (MDT), as well as to store and retrieve data (i.e. radio logs, field interviews, client information, schedules, etc.). A CAD dispatcher may announce the call details to field units over a two-way radio. Some systems communicate using a two-way radio system's selective calling features. CAD systems may send text messages with call-for-service details to alphanumeric pagers or wireless telephony text services like SMS (Short Messaging Service). The central idea is that persons in a dispatch center are able to easily view and understand the status of all units being dispatched. CAD provides displays and tools so that the dispatcher has an opportunity to handle calls-for-service as efficiently as possible.

When a CAD client interface 85 is employed, an additional receiver is present: a first responder unit, such as a fire brigade unit. The emergency operator, meanwhile, serves as a receiver for person-in-need and other senders, and also as a sender for the first responder receivers.

For example, the emergency operator dispatches a fire brigade unit in response to the incident. The emergency operator wants to convey the image content information to the fire brigade unit, but in this example the fire brigade unit uses a TETRA mobile which is not able to receive images. It is noted that the emergency operator is not necessary to this process beyond assigning the emergency to the fire brigade unit. Rather, the mediation portion 10 automatically decides that because the fire brigade unit has been assigned, it will receive the essential knowledge data from the sender's message. The routing portion 30 then contacts a unit service 75 for information on the fire brigade unit, and a resource service 77 for information on available transmission services, and thereby determines that the receiver supports TETRA Short Data Service (SDS) text messages, but not any form of image content. Therefore, the mediation portion 10 converts the image content knowledge graph to text, and the system sends the text as an SDS text message via a text message service 65b, TETRA data adapter 63b, and TETRA radio gateway 61b.

Preferably, the mediation portion 10 keeps information pre-cached at hand so that the dispatcher, who is mission-focused, maintains an additional dynamic "window to the world" that might help to gain additional necessary information with the mission at hand. In such cases, the dispatcher remains a receiver, notwithstanding assignment of the communication to a first responder unit, and the mediation portion 10 and routing portion 30 manages the process of providing information to the dispatcher appropriately as previously described with respect to FIG. 10.

In another example application, an image is captured of a truck with hazardous goods on a highway by a sender: for example, a police officer, a highway camera, or an automatic device. For some reason—e.g. hazardous goods are leaking, the truck is moving at an unsafe speed, the truck is not supposed to transport these goods on the specific road it was spotted on—it is necessary to find and stop the truck. Therefore, it is desirable to transmit the image to a group of mobile units in the area where the truck was spotted. In this group of mobile units, there are officers with equipment which cannot render the image. The image is therefore transformed into either text messages or audio as is appropriate to the group.

Preferably, even if the communication does not contain image content, other content is also reduced into a knowledge graph, or other content descriptive representation, by the interpretation unit before being further transformed into the appropriate message format. For example, text content of a message might read: "There is a propane truck exceeding the speed limit on Highway 270, going north. License plate is 2AA1234, from Maryland." The embodiment preferably identifies the key "objects" in this message as "hazard: speed," "truck: propane," "license plate: MD, 2AA1234," "highway: 270, north" or a similar, suitable arrangement. In reducing the message, the embodiment provides a consistent format for essential knowledge data, regardless of whether the original message content was image, text, or audio. In particular, such formatting eases processing by automatic response systems, and decreases "information overload" when a live user needs to find key information quickly. However, the original message is preferably also preserved, and the reduced content is appended to the original message in a suitable format, so that it may also be reviewed by a live user as convenient.

Likewise for images, even when a receiver's device fully supports image content, the knowledge graph is still preferably generated and appended to the image in a format which is also suitable for processing by the device of the receiver.

In another example application, a high-resolution image of a car incident showing the complete neighborhood is received from an automated system and processed by the interpretation portion 20, which reduces it to essential details that the interpretation portion has been trained to identify. For example, vehicles are identified and hazmat plates, if present, are highlighted. The routing portion 30, meanwhile, determines that the available first responder unit 130 is only equipped with P25 terminals, which cannot receive or process images but can receive text. The mediation portion 10, therefore, selects the relevant details of the incident, and converts it to the appropriate format of text-only communication. This text-based message is then transmitted through the routing portion 30 to the first responder unit 130. Similarly, if the available first responder unit 130 is only equipped with analog radio, which can only receive audio, the relevant details are synthesized into speech and transmitted. In this case, the presence and content of hazmat plates on one of the vehicles is included in the message, alerting the first responder unit 130 to bring the appropriate safety equipment.

While the above applications have generally assumed that the message being transformed is an image, it will be clear to those of skill in the art that the same principles may be adapted to transform other content types. For example, in one embodiment, an audio call is converted to text content through known speech transcription means, and key words in the text are identified by the interpreter portion 20, when the receiver is not capable of receiving audio (e.g. is a text-only pager).

The system may be implemented in still other applications and embodiments with the following features:

An IoT microphone or video camera generates an alarm when a gun or gun shot, fire, or some other dangerous situation is identified. The alarm is transmitted as an emergency communication to the system for transformation and transmission to the appropriate receiver, providing a virtual reporting of the incident without need for a human reporter. Both the content description and the underlying audio and video are preferably provided where the receiver is configured to receive both.

Alternatively, the IoT microphone or video camera continually communicates with the system, and the interpretation portion is trained to recognize dangerous conditions in progress and generate the alert to the emergency operator or to units that are handling incidents in that area.

A standard emergency phone call is analyzed in the interpretation portion to identify background sounds, providing additional information to the emergency operator.

An automatic system monitors social media channels, and the interpretation portion is trained to identify messages about an emergency situation. Again, this provides an automatic virtual report to the emergency operator or to units in the field.

These and related processes, and other necessary instructions, are preferably encoded as executable instructions on one or more non-transitory computer readable media, such as hard disc drives or optical discs, and executed using one or more computer processors, in concert with an operating system or other suitable measures.

In a software implementation, the software includes a plurality of computer executable instructions, to be implemented on a computer system. Prior to loading in a computer system, the software preferably resides as encoded information on a suitable non-transitory computer-readable tangible medium, such as a magnetic floppy disk, a magnetic tape, CD-ROM, or DVD-ROM.

In certain implementations, the invention includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

In certain implementations, the invention may be deployed in various environments, such as on the premises of the control room, in a remote data center, or elsewhere. On the premises, possible environments include but are not limited to bare metal servers and virtual machines. In a data center, possible environments include but are not limited to private, public, or governmental "clouds."

Using the disclosed system and method, incoming messages may be received from a wide variety of divergent applications and processes, "patching together" otherwise incompatible communication technologies. In the context of mission critical communications, access to this variety of communications improves awareness of the circumstances for those responding to potentially critical situations.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method steps are substitutable for those specifically shown and described, and certain features are usable independently of other features. Additionally, in various embodiments, all or some of the above embodiments are selectively combined with each other, and particular locations of elements or sequence of method steps are reversed or interposed, all without departing from the spirit or scope of the disclosed system and method as defined in the appended claims. The scope should therefore be determined with reference to the description above and the appended claims, along with their full range of equivalents.

What is claimed is:

1. A system for brokering mission critical communication transmitted by a sender for adaptive delivery to a receiver in ascertainable form, the system comprising:
   a mediator executing on a processor to receive a message from the sender in a first communication medium and adaptively generate a transformed message in a second communication medium ascertainable to the receiver, said mediator actuating delivery of the transformed message to the receiver;
   an interpreter executing on a processor responsive to said mediator to reduce the message received from the sender to essential knowledge data in accordance with predetermined mission critical criteria, said interpreter generating a content descriptive representation of the essential knowledge data; and,
   a router executing on a processor responsive to said mediator to determine a communication media compatibility of the receiver, said router selectively setting the second communication medium for the transformed message based thereon;
   wherein the system operates to broker mission critical communication transmitted between a plurality of senders and a plurality of receivers, the system adaptively patching at least one of the receivers for delivery thereto of mission critical communication transmitted by a selected one of the senders.

2. The system as recited in claim 1, wherein each of the first and second communication media supports at least one information content type selected from the group consisting of: image, text, audio, video, and speech.

3. The system as recited in claim 1, wherein said mediator, upon receiving the message in the first communication medium with image content, adaptively executes one of the following:
   a. where the second communication medium supports image content, actuate delivery of the message to the receiver without substantial transformation;
   b. where the second communication medium does not support image content but supports text content, convert at least a portion of the content descriptive representation to text in generating the transformed message, and actuate delivery of the transformed message to the receiver, the transformed message containing text indicative of one or more mission critical features extracted from image content of the message; and,
   c. where the second communication medium does not support image or text content but supports audio content, convert at least a portion of the content descriptive representation to text then synthesize to speech in generating the transformed message, and actuate delivery of the transformed message to the receiver, the transformed message containing audio indicative of one or more mission critical features extracted from image content of the message.

4. A system, for brokering mission critical communication transmitted by a sender for adaptive delivery to a receiver in ascertainable form, the system comprising:
   a mediator executing on a processor to receive a message from the sender in a first communication medium and adaptively generate a transformed message in a second communication medium ascertainable to the receiver, said mediator actuating delivery of the transformed message to the receiver;
   an interpreter executing on a processor responsive to said mediator to reduce the message received from the sender to essential knowledge data in accordance with predetermined mission critical criteria, said interpreter generating a content descriptive representation of the essential knowledge data; and,
   a router executing on a processor responsive to said mediator to determine a communication media compatibility of the receiver, said router selectively setting the second communication medium for the transformed message based thereon;
   wherein said interpreter includes an image interpreter service executing to detect at least one image object indicative of essential knowledge data, and contextually identify the detected image object with respect to the predetermined mission critical criteria in the content descriptive representation.

5. The system as recited in claim 4, wherein said interpreter accumulates training data including detectable image objects from received messages, said interpreter executing to acquire image object recognition by machine learning based on the training data.

6. The system as recited in claim 4, wherein the content descriptive representation is of a type selected from the group consisting of: a semantic representation or a syntactic representation.

7. The system as recited in claim 6, wherein the content descriptive representation is of semantic representation type having at least one configuration selected from the group consisting of: a domain ontology configuration and a knowledge graph configuration.

8. The system as recited in claim 1, wherein:
   the predetermined mission critical criteria are defined for an emergency response system, said mediator selectively actuating delivery to at least one of a plurality of receiver types including: a unit dispatcher and a first responder; and,
   said mediator is configured to receive the message and deliver the transformed message respectively over one or more communication technologies selected from the group consisting of: land mobile radio, telephone networks, online social media, software applications, and Internet of Things (IoT).

9. A system, for brokering mission critical communication transmitted by a sender for adaptive delivery to a receiver in ascertainable form, the system comprising:

a mediator executing on a processor to receive a message from the sender in a first communication medium and adaptively generate a transformed message in a second communication medium ascertainable to the receiver, said mediator actuating delivery of the transformed message to the receiver;

an interpreter executing on a processor responsive to said mediator to reduce the message received from the sender to essential knowledge data in accordance with predetermined mission critical criteria, said interpreter generating a content descriptive representation of the essential knowledge data; and, a router executing on a processor responsive to said mediator to determine a communication media compatibility of the receiver, said router selectively setting the second communication medium for the transformed message based thereon;

wherein:

the predetermined mission critical criteria are defined for an emergency response system, said mediator selectively actuating delivery to at least one of a plurality of receiver types including: a unit dispatcher and a first responder;

said mediator is configured to receive the message and deliver the transformed message respectively over one or more communication technologies selected from the group consisting of: land mobile radio, telephone networks, online social media, software applications, and Internet of Things (IoT); and, the land mobile radio technology includes P25, TETRA, LTE, and 5G standards; and the telephone networks technology includes emergency and non-emergency type networks using wired, wireless, or multi-media communication links.

10. The system as recited in claim 1, wherein the predetermined mission critical criteria are defined for an emergency response system; and, said mediator is configured to receive messages from a plurality of sender types including: an individual in need, security monitoring equipment, a smart device executing a condition-responsive software app, an Internet of Things (IoT) compatible device, and an online social media source.

11. A system for brokering mission critical telecommunication transmitted between a sender and a receiver adaptively patched thereto having disparate telecommunication media compatibilities, the system comprising:

a mediator executing on a processor to receive a message from the sender in a first telecommunication medium and adaptively generate a transformed message in a second telecommunication medium ascertainable to the receiver, said mediator actuating delivery of the transformed message to the receiver;

an interpreter executing on a processor responsive to said mediator to reduce the message received from the sender to essential knowledge data in accordance with predetermined mission critical criteria, said interpreter generating a knowledge graph of the essential knowledge data; and, a router executing on a processor responsive to said mediator to determine the telecommunication media compatibilities of the sender and receiver, said router selectively setting the second telecommunication medium for the transformed message based thereon;

wherein the system operates to broker mission critical communication transmitted between a plurality of senders and a plurality of receivers, the system adaptively patching at least one of the receivers for delivery thereto of mission critical communication transmitted by a selected one of the senders.

12. The system as recited in claim 11, wherein said interpreter includes an image interpreter service executing to detect at least one image object indicative of essential knowledge data, and contextually identify the detected image object with respect to the predetermined mission critical criteria in the knowledge graph.

13. The system as recited in claim 11, wherein said mediator, upon receiving the message in the first communication medium with image content, adaptively executes one of the following:

a. where the second telecommunication medium supports image content, actuate delivery of the message to the receiver without substantial transformation;

b. where the second telecommunication medium does not support image content but supports text content, convert at least a portion of the knowledge graph to text in generating the transformed message, and actuate delivery of the transformed message to the receiver, the transformed message containing text indicative of one or more mission critical features extracted from image content of the message; and, c. where the second telecommunication medium does not support image or text content but supports audio content, convert at least a portion of the knowledge graph to text then synthesize to speech in generating the transformed message, and actuate delivery of the transformed message to the receiver, the transformed message containing audio indicative of one or more mission critical features extracted from image content of the message.

14. The system as recited in claim 12, wherein said interpreter accumulates training data including detectable image objects from received messages, said interpreter executing to acquire image object recognition by machine learning based on the training data.

15. The system as recited in claim 11, wherein each of the first and second telecommunication media supports at least one information content type selected from the group consisting of: image, text, audio, video, and speech.

16. A method for brokering mission critical communication transmitted by a sender for adaptive delivery to a receiver in a form compatible therewith, the method comprising:

executing mediation on a processor to receive a message from the sender in a first communication medium and adaptively generate a transformed message in a second communication medium ascertainable to the receiver, said mediation controlling delivery of the transformed message to the receiver;

executing interpretation on a processor responsive to said mediation to reduce the message received from the sender to essential knowledge data in accordance with predetermined mission critical criteria, said interpretation generating a content descriptive representation of the essential knowledge data; and, executing routing on a processor responsive to said mediation to determine a communication media compatibility of the receiver, said routing selectively setting the second communication medium for the transformed message based thereon;

wherein transmission of mission critical communication is brokered between a plurality of senders and a plurality of receivers; and, at least one of the receivers is adaptively patched for delivery thereto of mission critical communication transmitted by a selected one of the senders.

17. The method as recited in claim 16, wherein each of the first and second communication media supports at least one information content type selected from the group consisting of: image, text, audio, video, and speech.

18. The method as recited in claim 17, wherein upon receiving the message in the first communication medium with image content, said mediation adaptively executes one of the following:
   a. where the second communication medium supports image content, actuate delivery of the message to the receiver without substantial transformation;
   b. where the second communication medium does not support image content but supports text content, convert at least a portion of the content descriptive representation to text in generating the transformed message, and actuate delivery of the transformed message to the receiver, the transformed message containing text indicative of one or more mission critical features extracted from image content of the message; and,
   c. where the second communication medium does not support image or text content but supports audio content, convert the content descriptive representation to text then synthesize to speech in generating the transformed message, and actuate delivery of the transformed message to the receiver, the transformed message containing audio indicative of one or more mission critical features extracted from image content of the message.

19. The method as recited in claim 16, wherein said interpretation includes an image interpreter service executing to detect at least one image object indicative of essential knowledge data, and contextually identify the detected image object with respect to the predetermined mission critical criteria in the content descriptive representation.

20. The method as recited in claim 19, wherein said interpretation accumulates training data including detectable image objects from received messages, said interpretation executing to acquire image object recognition by machine learning based on the training data.

21. A method for brokering mission critical communication transmitted by a sender for adaptive delivery to a receiver in a form compatible therewith, the method comprising:
   executing mediation on a processor to receive a message from the sender in a first communication medium and adaptively generate a transformed message in a second communication medium ascertainable to the receiver, said mediation controlling delivery of the transformed message to the receiver;
   executing interpretation on a processor responsive to said mediation to reduce the message received from the sender to essential knowledge data in accordance with predetermined mission critical criteria, said interpretation generating a content descriptive representation of the essential knowledge data; and,
   executing routing on a processor responsive to said mediation to determine a communication media compatibility of the receiver, said routing selectively setting the second communication medium for the transformed message based thereon;
   wherein said interpretation includes an image interpreter service executing to detect at least one image object indicative of essential knowledge data, and contextually identify the detected image object with respect to the predetermined mission critical criteria in the content descriptive representation;
   wherein the content descriptive representation is of a semantic representation type, and includes at least one knowledge graph.

22. The system as recited in claim 1, wherein the message received from at least one sender is transformed both in form and content to generate the transformed message for delivery to at least one receiver.

23. The system as recited in claim 16, wherein the message received from at least one sender is transformed both in form and content to generate the transformed message for delivery to at least one receiver.

* * * * *